US 9,466,016 B2

(12) United States Patent
Iwata et al.

(10) Patent No.: US 9,466,016 B2
(45) Date of Patent: Oct. 11, 2016

(54) IMAGE FORMING APPARATUS WHICH FORMS IMAGE DATA INDICATING WHETHER A PIXEL IS FOR A CHARACTER OR LINE

(71) Applicants: Muneaki Iwata, Kanagawa (JP);
Masaaki Ishida, Kanagawa (JP);
Atsufumi Omori, Kanagawa (JP);
Naoto Watanabe, Kanagawa (JP);
Hayato Fujita, Kanagawa (JP)

(72) Inventors: Muneaki Iwata, Kanagawa (JP);
Masaaki Ishida, Kanagawa (JP);
Atsufumi Omori, Kanagawa (JP);
Naoto Watanabe, Kanagawa (JP);
Hayato Fujita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/796,385

(22) Filed: Jul. 10, 2015

(65) Prior Publication Data
US 2016/0012322 A1     Jan. 14, 2016

(30) Foreign Application Priority Data
Jul. 14, 2014    (JP) ................................ 2014-144514

(51) Int. Cl.
*G06F 15/00*     (2006.01)
*G06K 1/00*     (2006.01)
(Continued)

(52) U.S. Cl.
CPC ........... *G06K 15/1874* (2013.01); *G06F 3/122* (2013.01); *G06F 3/1208* (2013.01); *G06K 15/14* (2013.01); *G06K 15/1822* (2013.01); *G06K 15/4055* (2013.01)

(58) Field of Classification Search
CPC ............. G06K 15/1874; G06K 15/14; G06K 15/1822; G06K 15/4055; G06F 3/122; G06F 3/1208
USPC .................................................. 358/1.1–1.18
See application file for complete search history.

(56) References Cited

U.S. PATENT DOCUMENTS 6,498,617 B1    12/2002   Ishida et al.
2002/0130944 A1    9/2002   Ema et al.
(Continued)

FOREIGN PATENT DOCUMENTS

JP     2008-085487     4/2008
JP     2009-081838     4/2009
(Continued)

OTHER PUBLICATIONS

U.S. Appl. No. 14/585,383, filed Dec. 30, 2014.

*Primary Examiner* — Douglas Tran
(74) *Attorney, Agent, or Firm* — Oblon, McClelland, Maier & Neustadt, L.L.P.

(57) ABSTRACT

An apparatus includes an image-processing-unit that generates tag information indicating whether each of pixels of a first-resolution image data is a pixel of a character or a line, a resolution-converting-unit that converts the first-resolution image data to image data with a second resolution higher than the first resolution, and a light-source-driving-unit that drives light-source according to the second-resolution image data. The resolution-converting-unit includes an image-matrix-acquiring-unit that acquires an image matrix being image data and tag information with the first resolution in an area containing a target-pixel and pixels around the target-pixel, a pattern-matching-unit that determines whether the target-pixel is a pixel of an edge of a character or a line based on the image matrix, and a first-converting-unit that, when the pixel is the edge pixel, converts the image data to image data with the second resolution of a pattern determined in accordance with a layout of the target-pixel.

16 Claims, 26 Drawing Sheets

(51) Int. Cl.
*G06K 15/02* (2006.01)
*G06K 15/14* (2006.01)
*G06F 3/12* (2006.01)
*G06K 15/00* (2006.01)

(56) References Cited

U.S. PATENT DOCUMENTS

| | | |
|---|---|---|
| 2003/0067533 A1 | 4/2003 | Omori et al. |
| 2003/0156184 A1 | 8/2003 | Suzuki et al. |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |
| 2007/0242127 A1 | 10/2007 | Omori et al. |
| 2008/0074699 A1 | 3/2008 | Washio |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0239336 A1 | 10/2008 | Tanabe et al. |
| 2009/0091805 A1 | 4/2009 | Tanabe et al. |
| 2010/0045767 A1 | 2/2010 | Nihei et al. |
| 2010/0214637 A1 | 8/2010 | Nihei et al. |
| 2012/0293783 A1 | 11/2012 | Ishida et al. |
| 2013/0243459 A1 | 9/2013 | Omori et al. |
| 2013/0302052 A1 | 11/2013 | Iwata et al. |
| 2014/0139603 A1 | 5/2014 | Fujita et al. |
| 2014/0139605 A1 | 5/2014 | Fujita et al. |
| 2014/0153021 A1* | 6/2014 | Matsumoto .................. 358/1.13 |
| 2014/0176656 A1 | 6/2014 | Omori et al. |
| 2014/0268186 A1 | 9/2014 | Iwata et al. |
| 2014/0327938 A1 | 11/2014 | Ishida et al. |
| 2014/0333940 A1* | 11/2014 | Iwata et al. ................... 358/1.1 |
| 2014/0333941 A1 | 11/2014 | Iwata et al. |
| 2015/0156373 A1 | 6/2015 | Fujita et al. |

FOREIGN PATENT DOCUMENTS

| | | |
|---|---|---|
| JP | 4640257 | 12/2010 |
| JP | 4968902 | 4/2012 |

* cited by examiner

2400 DPI

LINE IMAGE
(ASSIGN TAG INFORMATION
INDICATING LINE IMAGE)

TARGET PIXEL

FIG.18
■ BLACK PIXEL (WITH TAG)
▨ WHITE PIXEL (WITHOUT TAG)
□ ARBITRARY PIXEL
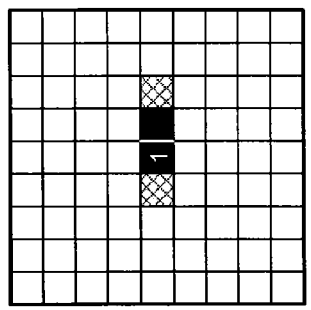
A
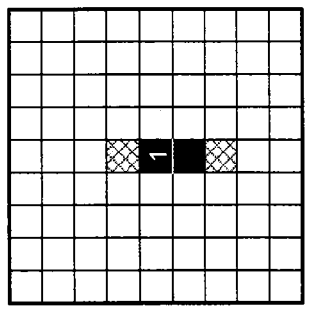
B
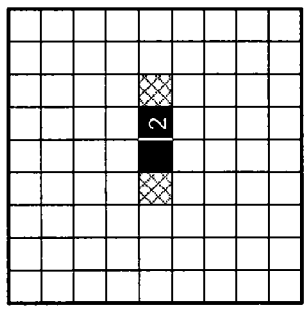
C
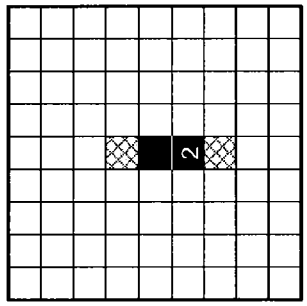
D
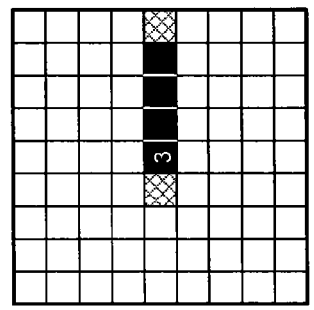
E
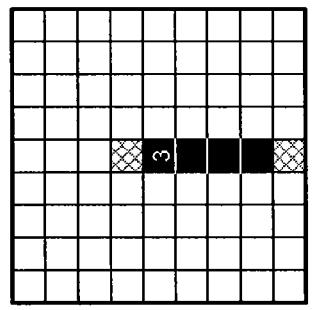
F
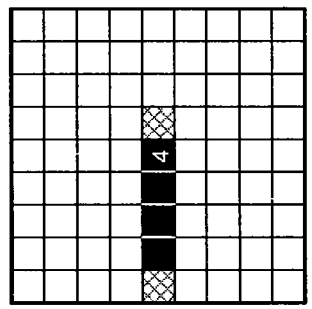
G
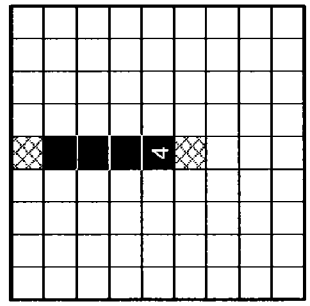
H
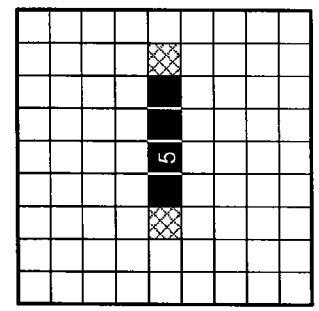
I
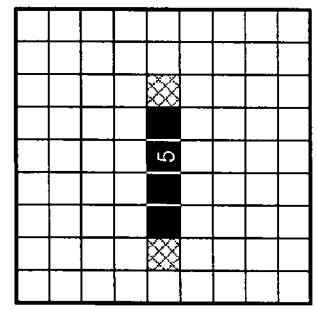
J
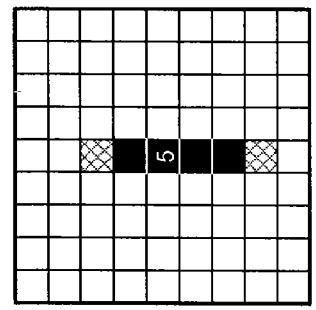
K
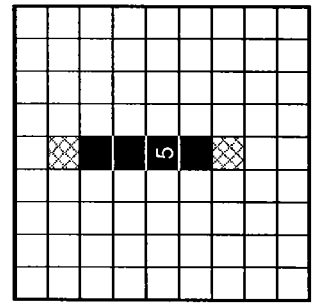
L FIG.28
▨ BLACK PIXEL (WITH TAG)
▨ WHITE PIXEL (WITHOUT TAG)
☐ ARBITRARY PIXEL
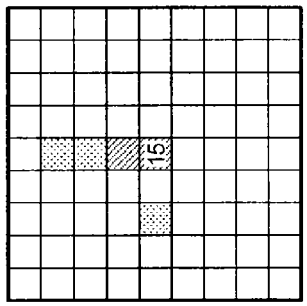
BM
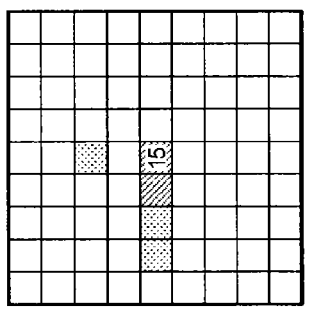
BN
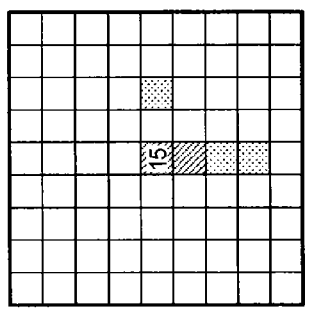
BO
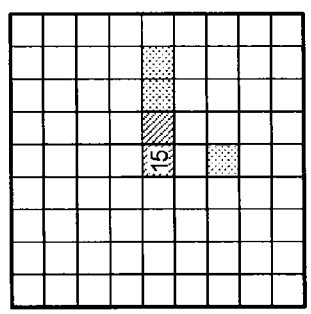
BP
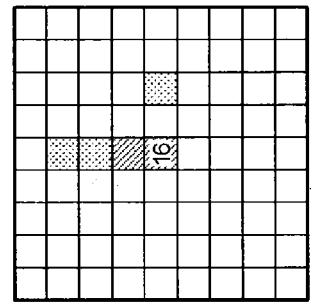
BQ
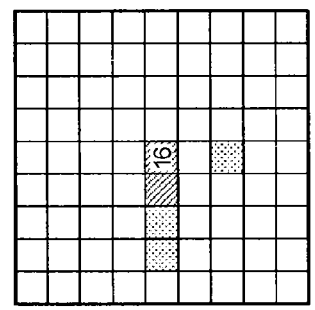
BR
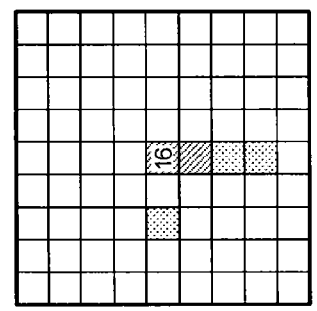
BS
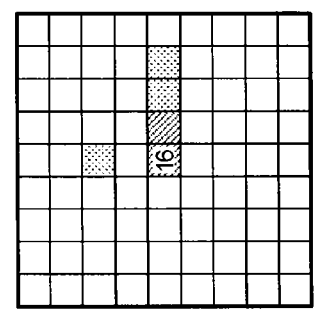
BT
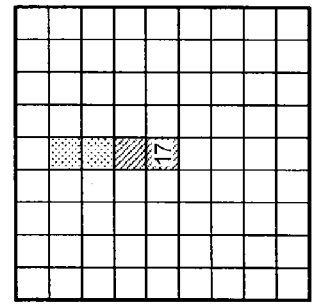
BU
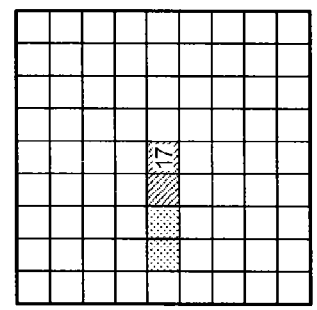
BV
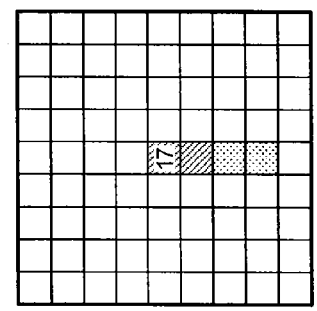
BW
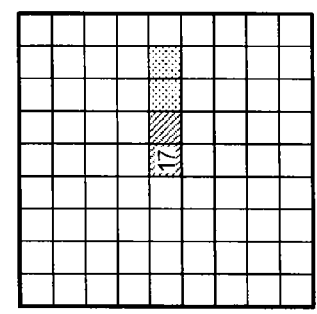
BX

IMAGE FORMING APPARATUS WHICH FORMS IMAGE DATA INDICATING WHETHER A PIXEL IS FOR A CHARACTER OR LINE

CROSS-REFERENCE TO RELATED APPLICATIONS

The present application claims priority to and incorporates by reference the entire contents of Japanese Patent Application No. 2014-144514 filed in Japan on Jul. 14, 2014.

BACKGROUND OF THE INVENTION

1. Field of the Invention

The present invention relates to an image forming apparatus.

2. Description of the Related Art

In recent years, digital printers employing an electrophotographic process have been increasingly used in the field of production printing. Therefore, there is a demand to improve image quality and reliability in the digital printers employing the electrophotographic process. In particular, in the digital printers employing the electrophotographic process, there is a demand to improve the reproducibility of thin lines, improve the reproducibility of characters (improve the reproducibility of characters with minute sizes corresponding to two or three points, for example), prevent thickening of the characters due to the electrophotographic process, and improve the accuracy for color shift.

To improve the image quality, a digital printer employing the electrophotographic processes includes an image processing unit that corrects image data through image processing. The image processing unit performs image processing by using multi-bit data with a high resolution of 1200 dots per inch (dpi) or 2400 dpi, for example.

The digital printer employing the electrophotographic process includes a photoconductor drum with a surface serving as a scanning surface having photosensitivity, a light source that emits a laser beam, a polygon mirror that deflects the laser beam from the light source, and a scanning optical system that guides the laser beam deflected by the polygon mirror to the surface (scanning surface) of the photoconductor drum. The digital printer employing the electrophotographic process modulates a light flux emitted from the light source in accordance with image data, irradiates the scanning surface with the light flux from the light source, and scans the scanning surface with the light flux, thereby forming an electrostatic latent image corresponding to the image data on the photoconductor drum.

The digital printer employing the electrophotographic process configured as described above uses an element with a plurality of light-emitting points, such as a laser diode array (LDA) or a vertical-cavity surface-emitting laser (VCSEL), as the light source. Therefore, the digital printer employing the electrophotographic process can form an electrostatic latent image with a resolution of, for example, 2400 dpi or 4800 dpi, which is higher than that of image data with the resolution of 1200 dpi.

Japanese Patent No. 4968902 and Japanese Patent No. 4640257 disclose a technology for detecting an outline portion in an image and enhancing an outline line or correcting pixels around an outline character through a process by the image processing unit to thereby prevent reversed characters from becoming broken and improve the reproducibility of the characters. Japanese Laid-open Patent Publication No. 2008-85487 discloses a technology for causing a controller to thin a line and perform smoothing simultaneously by using template matching with multi-value data.

Incidentally, if image processing is performed with a high density, a defect may occur in data transfer from the image processing unit to a light source driving circuit on the downstream side. If multi-bit data with a resolution of, for example, 2400 dpi or 4800 dpi, is used by the image processing unit, the flexibility of image processing is increased and the reproducibility of minute characters or lines of 1200 dpi can be improved. However, if the image processing is performed with a high density, the amount of data transferred from the image processing unit to the light source driving circuit on the downstream side greatly increases, which is the bottleneck of the productivity.

If all of the processes for improving the reproducibility of minute characters or the like are performed by the image processing unit on the upstream side, the processes become complex and loads on the image processing unit increase.

In view of the above circumstances, there is a need to improve image quality by performing image processing with a high resolution without increasing the amount of image data to be transferred.

SUMMARY OF THE INVENTION

It is an object of the present invention to at least partially solve the problems in the conventional technology.

According to the present invention, there is provides an image forming apparatus that forms an image corresponding to light emitted by a light source, the image forming apparatus comprising: an image processing unit that forms image data with a first resolution and tag information indicating whether or not each of pixels of the image data is a pixel of a character or a line based on input image data; a resolution converting unit that sequentially selects target pixels from the image data with the first resolution, and converts the image data with the first resolution to image data with a second resolution higher than the first resolution for each of the target pixels; and a light source driving unit that drives the light source by a modulation signal corresponding to the image data with the second resolution, wherein the resolution converting unit includes an image matrix acquiring unit that acquires an image matrix that is image data and tag information with the first resolution in an area containing each of the target pixels and pixels around the target pixel; a pattern matching unit that determines whether or not the target pixel is a pixel of an edge of a character or a line based on a layout of the image data and the tag information in the image matrix; and a first converting unit that, when the target pixel is the pixel of the edge of the character or the line, converts the image data to image data with the second resolution of a pattern that is determined in accordance with the layout.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a diagram illustrating a first example of layouts of image matrices for determining whether a target pixel is a pixel of an edge of a line image;

FIG. 28 is a diagram illustrating a second example of layouts of image matrices for determining whether a target pixel is a pixel of an edge of an outline line image;

DETAILED DESCRIPTION OF THE PREFERRED EMBODIMENTS

A color printer 2000, which is an example of an image forming apparatus as an embodiment of the present invention, will be described in detail below with reference to the accompanying drawings.

Figure 1:
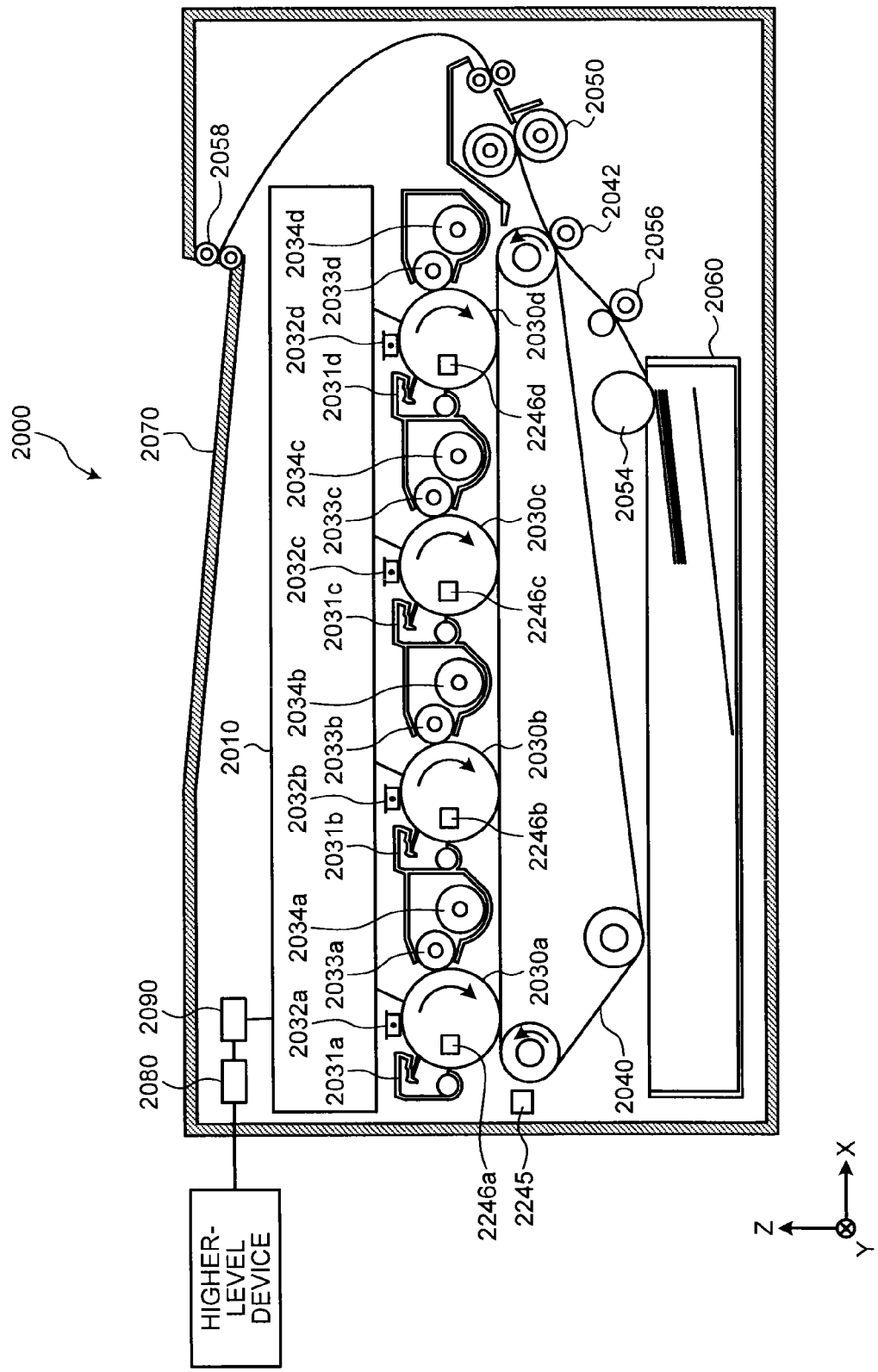
FIG. 1 is a diagram illustrating a schematic configuration of a color printer according to an embodiment of the present invention.

FIG. 1 is a diagram illustrating a schematic configuration of the color printer 2000 according to the embodiment. The color printer 2000 generates a printed material by transferring toner to a recording paper (object). The color printer 2000 is a multicolor printer of a tandem system that forms a full-color image by superimposing four colors (black, cyan, magenta, and yellow).

The color printer 2000 includes an optical scanning device 2010, four photoconductor drums 2030a, 2030b, 2030c, and 2030d (all four may be collectively referred to as photoconductor drums 2030), four cleaning units 2031a, 2031b, 2031c, and 2031d (all four may be collectively referred to as cleaning units 2031), and four charging devices 2032a, 2032b, 2032c, and 2032d (all four may be collectively referred to as charging devices 2032). The color printer 2000 further includes four developing rollers 2033a, 2033b, 2033c, and 2033d (all four may be collectively referred to as developing rollers 2033), and four toner cartridges 2034a, 2034b, 2034c, and 2034d (all four may be collectively referred to as toner cartridges 2034). The color printer 2000 further includes a transfer belt 2040, a transfer roller 2042, a fixing roller 2050, a paper feeding roller 2054, a registration roller pair 2056, a paper ejection roller 2058, a paper feeding tray 2060, a paper ejection tray 2070, a communication control device 2080, a density detector 2245, four home position sensors 2246a, 2246b, 2246c, and 2246d (all four may be collectively referred to as home position sensors 2246), and a printer control device 2090.

The communication control device 2080 controls bidirectional communication with a higher-level device (for example, a computer) via a network or the like.

The printer control device 2090 integrally controls the components of the color printer 2000. The printer control device 2090 includes a central processing unit (CPU), a read only memory (ROM) that stores therein a program in the form of code to be executed by the CPU and various kinds of data used for execution of the program, a random access memory (RAM) as a work memory, an analog-to-digital conversion circuit that converts analog data to digital data, and the like. The printer control device 2090 controls the components in response to a request from the higher-level device, and sends image data from the higher-level device to the optical scanning device 2010.

The photoconductor drum 2030a, the charging device 2032a, the developing roller 2033a, the toner cartridge 2034a, and the cleaning unit 2031a are used as a set. These components form an image forming station for forming a black image (also referred to as a K station).

The photoconductor drum 2030b, the charging device 2032b, the developing roller 2033b, the toner cartridge 2034b, and the cleaning unit 2031b are used as a set. These components form an image forming station for forming a cyan image (also referred to as a C station).

The photoconductor drum 2030c, the charging device 2032c, the developing roller 2033c, the toner cartridge 2034c, and the cleaning unit 2031c are used as a set. These components form an image forming station for forming a magenta image (also referred to as an M station).

The photoconductor drum 2030d, the charging device 2032d, the developing roller 2033d, the toner cartridge 2034d, and the cleaning unit 2031d are used as a set. These components form an image forming station for forming a yellow image (also referred to as a Y station).

Each of the photoconductor drums 2030 is an example of a latent image bearer having a photosensitive layer on the surface. The surface of each of the photoconductor drums 2030 serves as a scanning surface. The photoconductor drums 2030a, 2030b, 2030c, and 2030d are arrayed such that rotational axes are parallel to one another, and all of the photoconductor drums rotate in the same direction (for example, in the direction of arrow in plane in FIG. 1), for example.

In the following descriptions, the XYZ three-dimensional Cartesian coordinates system will be used, where the Y-axis direction is a direction parallel to the central axes of the photoconductor drums 2030 and the X-axis direction is a direction along which the photoconductor drums 2030 are arrayed.

Each of the charging devices 2032 uniformly charges the surface of the corresponding photoconductor drum 2030. Each of the optical scanning devices 2010 irradiates the charged surface of the corresponding photoconductor drum 2030 with a modulated light flux for each color based on image data (black image data, cyan image data, magenta image data, or yellow image data). Therefore, electric charges are lost in only a portion of the surface of each of the photoconductor drums 2030 irradiated with the light, and a latent image corresponding to the image data is formed on the surface of each of the photoconductor drums 2030. The latent images thus formed moves toward the corresponding developing rollers 2033 along with rotation of the photoconductor drums 2030. The configuration of the optical scanning device 2010 will be described in detail later.

A region of each of the photoconductor drums 2030 in which image data is written may be referred to as "an effectively scanned region", "an image formed region", or "an effective pixel region".

The toner cartridge 2034a contains black toner. The black toner is supplied to the developing roller 2033a. The toner cartridge 2034b contains cyan toner. The cyan toner is supplied to the developing roller 2033b. The toner cartridge 2034c contains magenta toner. The magenta toner is supplied to the developing roller 2033c. The toner cartridge 2034d contains yellow toner. The yellow toner is supplied to the developing roller 2033d.

On the surface of the developing rollers 2033, toner provided from the corresponding toner cartridge 2034 is uniformly applied in a thin layer along with the rotation. The toner on the surface of each of the developing rollers 2033 comes in contact with the surface of the corresponding photoconductor drum 2030, and is transferred and adheres to only the portion of the surface irradiated with the light. Specifically, each of the developing rollers 2033 attaches the toner to the latent image formed on the surface of the corresponding photoconductor drum 2030 to visualize the image.

The transfer belt 2040 is wound around a belt rotation mechanism, and rotates in one direction. An outer surface of the transfer belt 2040 comes in contact with the surface of each of the photoconductor drums 2030a, 2030b, 2030c, and 2030d, in a position opposite to the corresponding optical scanning device 2010. The outer surface of the transfer belt 2040 also comes in contact with the transfer roller 2042.

An image formed with the toner attached thereto (toner image) on the surface of each of the photoconductor drums 2030 moves toward the transfer belt 2040 along with the rotation of the photoconductor drums 2030. The toner images of yellow, magenta, cyan, and black are sequentially transferred to the transfer belt 2040 at a predetermined timing in a superimposed manner, so that a color image is formed. The color image formed on the transfer belt 2040 moves toward the transfer roller 2042 along with the movement of the transfer belt 2040.

The paper feeding tray 2060 stores therein recording papers. The paper feeding roller 2054 is disposed near the paper feeding tray 2060. The paper feeding roller 2054 picks out recording papers one by one from the paper feeding tray 2060, and conveys each of the recording papers to the registration roller pair 2056.

The registration roller pair 2056 feeds the recording paper to a gap between the transfer belt 2040 and the transfer roller 2042 at a predetermined timing. Therefore, the color image on the transfer belt 2040 is transferred to the recording paper. The recording paper subjected to the transfer is conveyed to the fixing roller 2050.

The fixing roller 2050 applies heat and pressure to the recording paper. Therefore, the fixing roller 2050 fixes the toner to the recording paper. The recording paper with the fixed toner is conveyed to the paper ejection tray 2070 through the paper ejection roller 2058, and sequentially stacked on the paper ejection tray 2070.

Each of the cleaning units 2031 removes toner (residual toner) remaining on the surface of the corresponding photoconductor drum 2030. The surface of the photoconductor drum 2030 from which the residual toner is removed returns to the position facing the corresponding charging device 2032.

Figure 2:
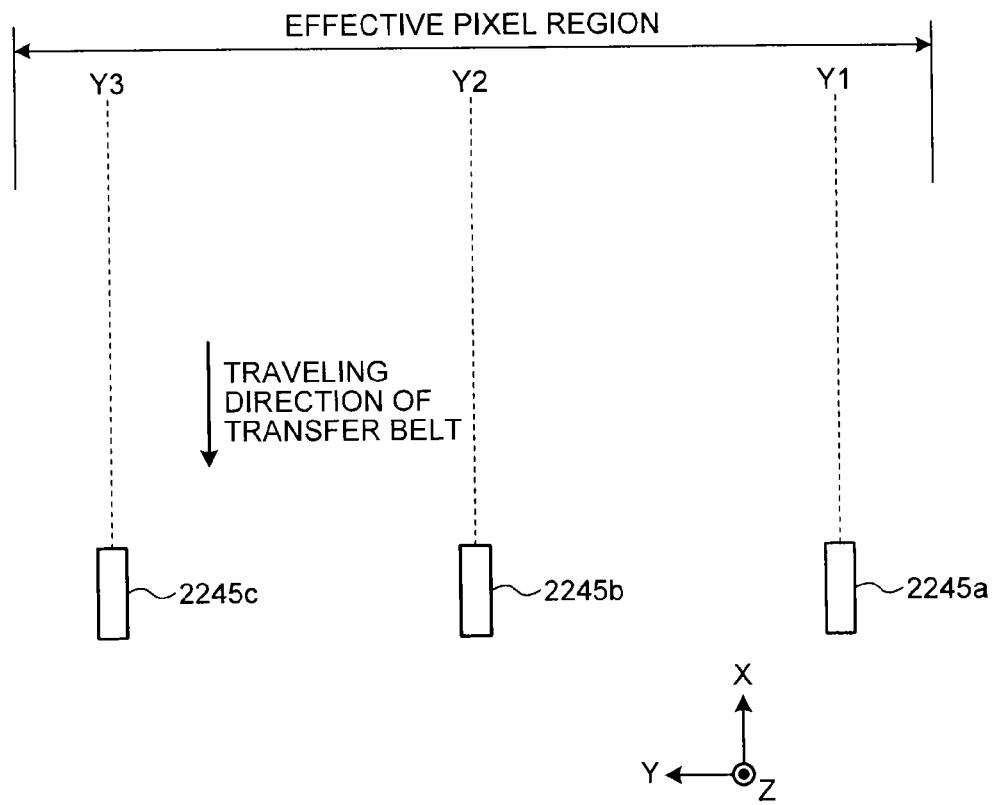
FIG. 2 is a diagram illustrating an example of an arrangement of optical sensors.

The density detector 2245 is disposed on the negative X side of the transfer belt 2040 (on the upstream side of the fixing roller 2050 and on the downstream side of the four photoconductor drums 2030 in the traveling direction of the transfer belt 2040). As one example, the density detector 2245 includes three optical sensors 2245a, 2245b, and 2245c as illustrated in FIG. 2.

The optical sensor 2245a is disposed so as to face the vicinity of the edge of the negative Y side in the effective image region of the transfer belt 2040 (on one end side of the transfer belt 2040 in the width direction). The optical sensor 2245c is disposed so as to face the vicinity of the edge of the positive Y side in the effective image region of the transfer belt 2040 (on the other end side of the transfer belt 2040 in the width direction). The optical sensor 2245b is disposed approximately in the middle position between the optical sensor 2245a and the optical sensor 2245c in the main-scanning direction (the middle position in the width direction of the transfer belt 2040). Herein, the center position of the optical sensor 2245a is denoted by Y1, the center position of the optical sensor 2245b is denoted by Y2, and the center position of the optical sensor 2245c is denoted by Y3 in the main-scanning direction (the Y-axis direction).

Figure 3:
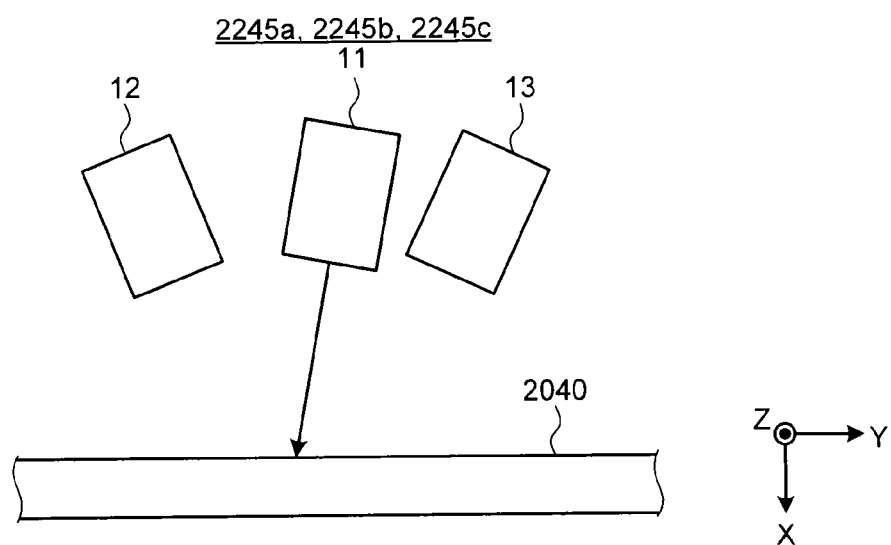
FIG. 3 is a diagram illustrating a configuration of the optical sensors.

As illustrated in FIG. 3, each of the optical sensors 2245a, 2245b, and 2245c includes, as one example, a light emitting diode (LED) 11 that emits light (hereinafter, also referred to as detection light) toward the transfer belt 2040, a specularly-reflected light receiving element 12 that receives specularly-reflected light from the transfer belt 2040 or a toner pad on the transfer belt 2040, and a diffusely-reflected light receiving element 13 that receives diffusely-reflected light from the transfer belt 2040 or the toner pad on the transfer belt 2040. Each of the light receiving elements outputs a signal corresponding to the amount of received light (photoelectric conversion signal).

The home position sensor 2246a detects a home position of rotation of the photoconductor drum 2030a. The home position sensor 2246b detects a home position of rotation of the photoconductor drum 2030b. The home position sensor 2246c detects a home position of rotation of the photoconductor drum 2030c. The home position sensor 2246d detects a home position of rotation of the photoconductor drum 2030d.

Figure 4:
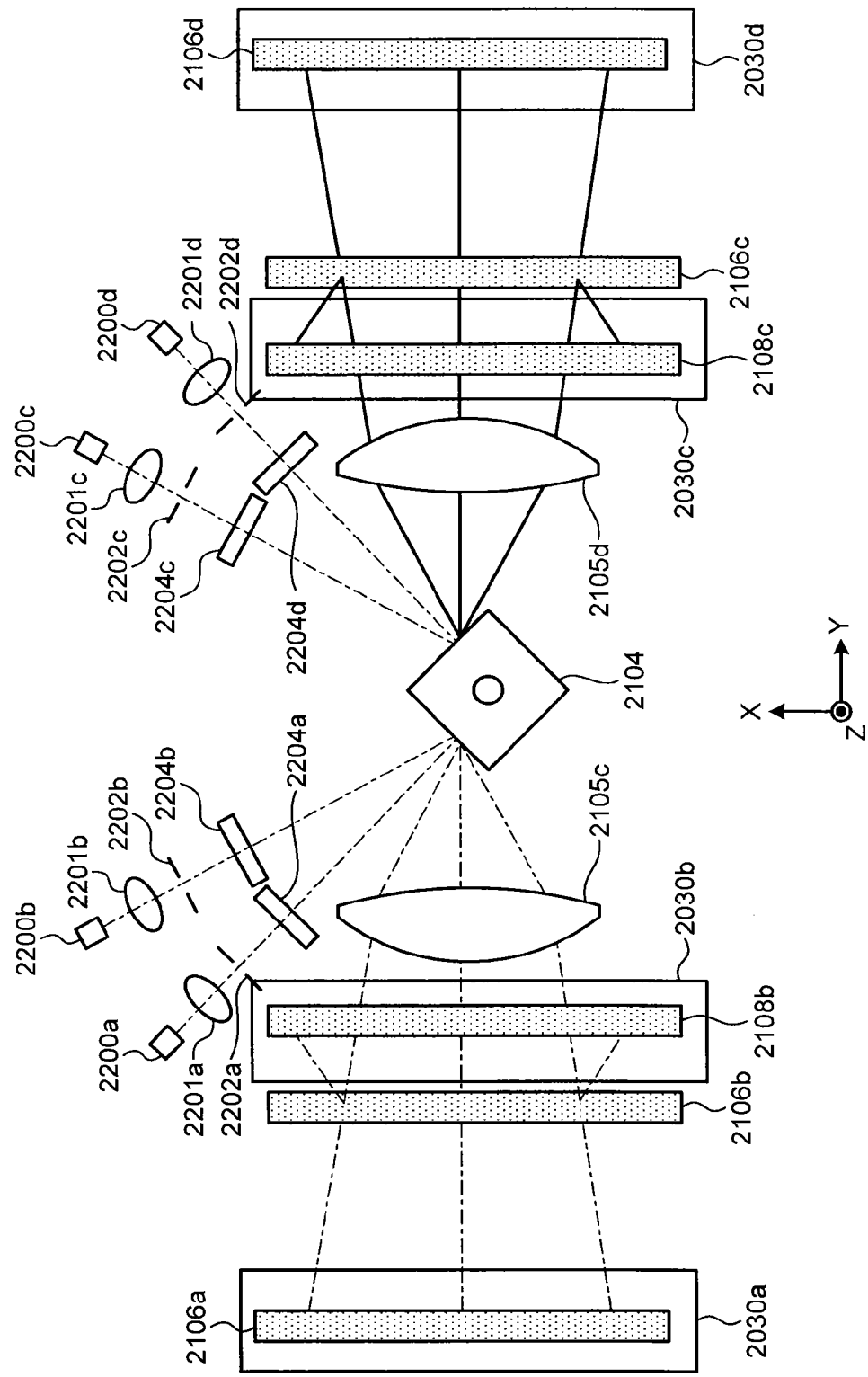
FIG. 4 is a diagram illustrating a configuration of an optical system of an optical scanning device.
Figure 5:
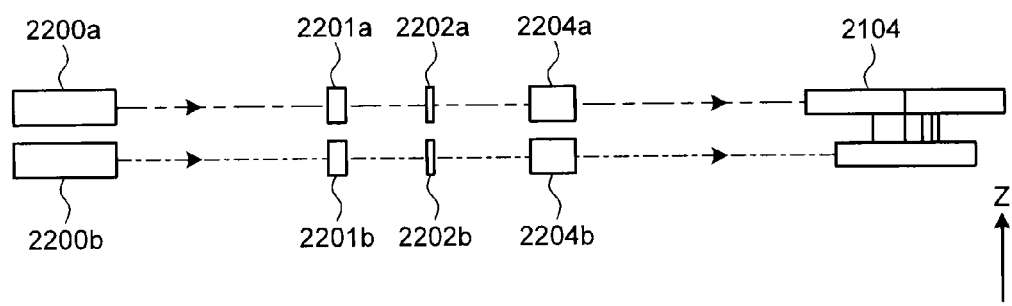
FIG. 5 is a diagram illustrating an example of an optical path from a light source to a polygon mirror and an optical path from a light source to the polygon mirror.
Figure 6:
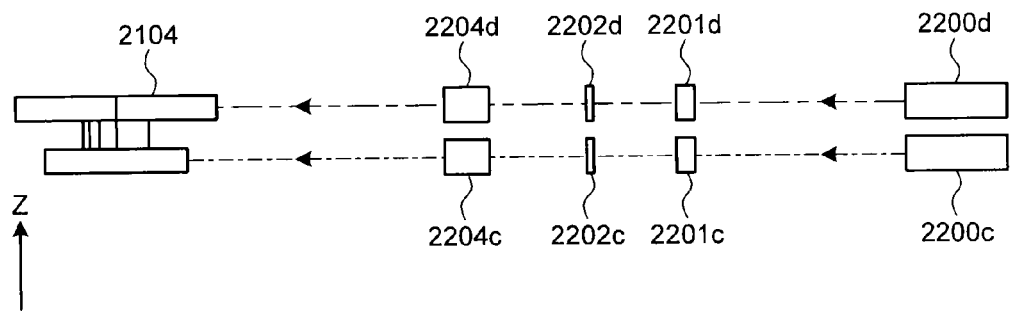
FIG. 6 is a diagram illustrating an example of an optical path from a light source to the polygon mirror and an optical path from a light source to the polygon mirror.
Figure 7:
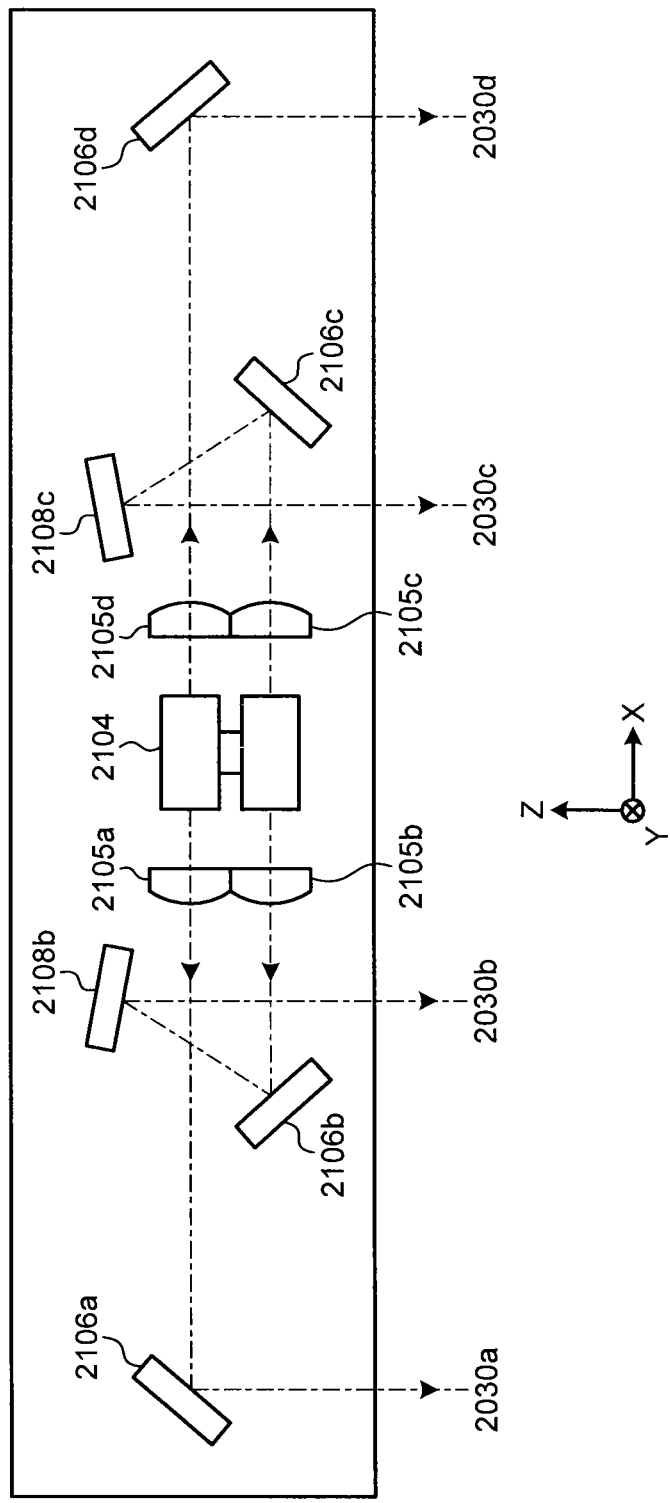
FIG. 7 is a diagram illustrating an example of optical paths from the polygon mirror to photoconductor drums.

FIG. 4 is a diagram illustrating a configuration of an optical system of the optical scanning device 2010. FIG. 5 is a diagram illustrating an example of an optical path from a light source 2200a to the polygon mirror 2104 and an optical path from a light source 2200b to the polygon mirror 2104. FIG. 6 is a diagram illustrating an example of an optical path from a light source 2200c to the polygon mirror 2104 and an optical path from a light source 2200d to the polygon mirror 2104. FIG. 7 is a diagram illustrating an example of optical paths from the polygon mirror 2104 to the photoconductor drums 2030.

The configuration of the optical system of the optical scanning device 2010 will be described. The optical scanning device 2010 includes, as the optical system, four light sources 2200a, 2200b, 2200c, and 2200d, four coupling lenses 2201a, 2201b, 2201c, and 2201d, four aperture plates 2202a, 2202b, 2202c, and 2202d, and four cylindrical lenses 2204a, 2204b, 2204c, and 2204d. The optical scanning device 2010 further includes, as the optical system, a polygon mirror 2104, four scanning lenses 2105a, 2105b, 2105c, and 2105d, and six reflecting mirrors 2106a, 2106b, 2106c, 2106d, 2108b, and 2108c. These components are assembled at predetermined positions in an optical housing.

The optical scanning device 2010 also includes a circuit of an electric system. The circuit of the electric system will be described later with reference to FIG. 8 and the subsequent drawings.

Each of the light sources 2200a, 2200b, 2200c, and 2200d includes a surface-emitting laser array, in which a plurality of light-emitting units are two-dimensionally arrayed. The light-emitting units of the surface-emitting laser array are arranged such that the interval between adjacent light-emitting units is constant when all of the light-emitting units are orthographically projected on an imaginary line extending in the direction corresponding to the sub-scanning direction. Each of the light sources 2200a, 2200b, 2200c, and 2200d is, for example, a vertical-cavity surface-emitting laser (VCSEL).

The coupling lens 2201a is disposed on the optical path of a light flux emitted by the light source 2200a, and makes the light flux passing therethrough into an approximately parallel light flux. The coupling lens 2201b is disposed on the optical path of a light flux emitted by the light source 2200b, and makes the light flux passing therethrough into an approximately parallel light flux. The coupling lens 2201c is disposed on the optical path of a light flux emitted by the light source 2200c, and makes the light flux passing therethrough into an approximately parallel light flux. The coupling lens 2201d is disposed on the optical path of a light flux emitted by the light source 2200d, and makes the light flux passing therethrough into an approximately parallel light flux.

The aperture plate 2202a includes an aperture, and shapes the light flux coming through the coupling lens 2201a. The aperture plate 2202b includes an aperture, and shapes the light flux coming through the coupling lens 2201b. The aperture plate 2202c includes an aperture, and shapes the light flux coming through the coupling lens 2201c. The aperture plate 2202d includes an aperture, and shapes the light flux coming through the coupling lens 2201d.

The cylindrical lens 2204a forms an image by the light flux passing through the aperture of the aperture plate 2202a, in the vicinity of a deflection/reflection surface of the polygon mirror 2104 in the Z-axis direction. The cylindrical lens 2204b forms an image by the light flux passing through the aperture of the aperture plate 2202b, in the vicinity of a deflection/reflection surface of the polygon mirror 2104 in the Z-axis direction. The cylindrical lens 2204c forms an image by the light flus passing through the aperture of the aperture plate 2202c, in the vicinity of a deflection/reflection surface of the polygon mirror 2104 in the Z-axis direction. The cylindrical lens 2204d forms an image by the light flux passing through the aperture of the aperture plate 2202d, in the vicinity of a deflection/reflection surface of the polygon mirror 2104 in the Z-axis direction.

The optical system configured with the coupling lens 2201a, the aperture plate 2202a, and the cylindrical lens 2204a is a pre-deflector optical system of the K station. The optical system configured with the coupling lens 2201b, the aperture plate 2202b, and the cylindrical lens 2204b is a pre-deflector optical system of the C station. The optical system configured with the coupling lens 2201c, the aperture plate 2202c, and the cylindrical lens 2204c is a pre-deflector optical system of the M station. The optical system configured with the coupling lens 2201d, the aperture plate 2202d, and the cylindrical lens 2204d is a pre-deflector optical system of the Y station.

The polygon mirror 2104 includes two stages of four-sided mirrors that rotate around an axis parallel to the Z-axis, and each mirror serves as a deflection/reflection surface. The light flux from the cylindrical lens 2204b and the light flux from the cylindrical lens 2204c are deflected by the four-sided mirror in the first stage (lower stage), and the light flux from the cylindrical lens 2204a and the light flux from the cylindrical lens 2204d are deflected by the four-sided mirror in the second stage (upper stage).

The light flux from the cylindrical lens 2204a and the light flux from the cylindrical lens 2204b are deflected to the negative X side of the polygon mirror 2104, and the light flux from the cylindrical lens 2204c and the light flux from the cylindrical lens 2204d are deflected to the positive X side of the polygon mirror 2104.

Each of the scanning lenses 2105a, 2105b, 2105c, and 2105d has optical power for condensing the light flux to a point near the corresponding photoconductor drum 2030, and has optical power for moving an optical spot, by the rotation of the polygon mirror 2104, in the main-scanning direction at a constant speed on the surface of the corresponding photoconductor drum 2030.

The scanning lens 2105a and the scanning lens 2105b are disposed on the negative X side of the polygon mirror 2104. The scanning lens 2105c and the scanning lens 2105d are disposed on the positive X side of the polygon mirror 2104.

The scanning lens 2105a and the scanning lens 2105b are laminated in the Z-axis direction. The scanning lens 2105b faces the four-sided mirror in the first stage. The scanning lens 2105a faces the four-sided mirror in the second stage.

The scanning lens 2105c and the scanning lens 2105d are laminated in the Z-axis direction. The scanning lens 2105c faces the four-sided mirror in the first stage. The scanning lens 2105d faces the four-sided mirror in the second stage.

The light flux from the cylindrical lens 2204a is deflected by the polygon mirror 2104, and emitted to the photoconductor drum 2030a via the scanning lens 2105a and the reflecting mirror 2106a to form an optical spot. The optical spot moves in the longitudinal direction of the photoconductor drum 2030a along with the rotation of the polygon mirror 2104. That is, the photoconductor drum 2030a is scanned with the optical spot. The moving direction of the optical spot at this time is the "main-scanning direction" of the photoconductor drum 2030a, and the rotation direction of the photoconductor drum 2030a at this time is the "sub-scanning direction" of the photoconductor drum 2030a.

The light flux from the cylindrical lens 2204b is deflected by the polygon mirror 2104, and emitted to the photoconductor drum 2030b via the scanning lens 2105b, the reflecting mirror 2106b, and the reflecting mirror 2108b to form an optical spot. The optical spot moves in the longitudinal direction of the photoconductor drum 2030b along with the rotation of the polygon mirror 2104. That is, the photoconductor drum 2030b is scanned with the optical spot. The moving direction of the optical spot at this time is the "main-scanning direction" of the photoconductor drum 2030b, and the rotation direction of the photoconductor drum 2030b at this time is the "sub-scanning direction" of the photoconductor drum 2030b.

The light flux from the cylindrical lens 2204c is deflected by the polygon mirror 2104, and emitted to the photoconductor drum 2030c via the scanning lens 2105c, the reflecting mirror 2106c, and the reflecting mirror 2108c to form an optical spot formed. The optical spot moves in the longitudinal direction of the photoconductor drum 2030c along with the rotation of the polygon mirror 2104. That is, the photoconductor drum 2030c is scanned with the optical spot. The moving direction of the optical spot at this time is the "main-scanning direction" of the photoconductor drum 2030c, and the rotation direction of the photoconductor drum 2030c at this time is the "sub-scanning direction" of the photoconductor drum 2030c.

The light flux from the cylindrical lens 2204d is deflected by the polygon mirror 2104, and emitted to the photoconductor drum 2030d via the scanning lens 2105d and the reflecting mirror 2106d to form an optical spot. The optical spot moves in the longitudinal direction of the photoconductor drum 2030d along with the rotation of the polygon mirror 2104. That is, the photoconductor drum 2030d is scanned with the optical spot. The moving direction of the optical spot at this time is the "main-scanning direction" of the photoconductor drum 2030d, and the rotation direction of the photoconductor drum 2030d at this time is the "sub-scanning direction" of the photoconductor drum 2030d.

Each of the reflecting mirrors 2106a, 2106b, 2106c, 2106d, 2108b, and 2108c is disposed such that the optical path length from the polygon mirror 2104 to the corresponding photoconductor drum 2030 is constant and such that the incident position and the incident angle of the light flux with respect to the corresponding photoconductor drum 2030 is constant.

The optical system disposed on the optical path between the polygon mirror 2104 and each of the photoconductor drums 2030 is also referred to as a scanning optical system. Herein, the scanning optical system of the K station includes the scanning lens 2105a and the reflecting mirror 2106a. The scanning optical system of the C station includes the scanning lens 2105b and the two reflecting mirrors 2106b and 2108b. The scanning optical system of the M station includes the scanning lens 2105c and the two reflecting mirrors 2106c and 2108c. The scanning optical system of the Y station includes the scanning lens 2105d and the reflecting mirror 2106d. In each of the scanning optical systems, the scanning lens 2105 may include a plurality of lenses.

Figure 8:
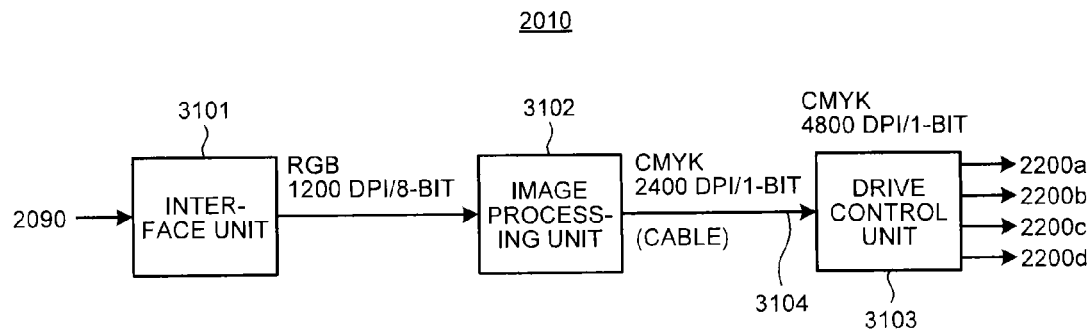
FIG. 8 is a diagram illustrating a configuration of an electric system of the optical scanning device.

FIG. 8 is a diagram illustrating a configuration of the electric system of the optical scanning device 2010. The optical scanning device 2010 includes, as the configuration of the electric system, an interface unit 3101, an image processing unit 3102, and a drive control unit 3103.

The interface unit 3101 acquires, from the printer control device 2090, image data transferred from a higher-level device (for example, a computer). The interface unit 3101 sends the acquired image data to the image processing unit 3102 in the subsequent stage.

In this example, the interface unit 3101 acquires image data in the RGB format, with the resolution of 1200 dpi, and with the bit number of 8, and sends the image data to the image processing unit 3102.

The image processing unit 3102 functions as an image processor. The image processing unit 3102 acquires image data from the interface unit 3101, and converts the image data to color image data corresponding to a printing method. As one example, the image processing unit 3102 converts image data in the RGB format into image data in the tandem format (CMYK format). The image processing unit 3102 performs various kinds of image processing in addition to conversion of data formats.

In this example, the image processing unit 3102 outputs image data in the CMYK format, with the resolution of 2400 dpi, and with the bit number of 1. The resolution of the image data output from the image processing unit 3102 is not limited to 2400 dpi. The resolution of the image data output from the image processing unit 3102 is referred to as a first resolution.

The image processing unit 3102 generates tag information indicating whether or not each of pixels of the image data with the first resolution (2400 dpi) is a pixel of a character or a line. The image processing unit 3102 sends the image data and the tag information with the first resolution generated as above to the drive control unit 3103.

The drive control unit 3103 acquires the image data and the tag information with the first resolution from the image processing unit 3102, and converts the image data into color image data with a second resolution corresponding to drive of the light source. The second resolution is higher than the first resolution. In this example, the drive control unit 3103 converts the image data into image data in the CMYK format, with the resolution of 4800 dpi, and with the bit number of 1.

The drive control unit 3103 modulates the image data with the second resolution to a clock signal indicating a light emission timing of a pixel to generate an independent modulation signal for each color. The drive control unit 3103 drives the light sources 2200a, 2200b, 2200c, and 2200d in accordance with the modulation signals corresponding to the respective colors to emit light. The drive control unit 3103 may integrally perform the resolution conversion process and the modulation process.

The drive control unit 3103 is, for example, a single-chip integrated device provided in the vicinity of the light sources 2200a, 2200b, 2200c, and 2200d. The image processing unit 3102 and the interface unit 3101 are disposed farther from the light sources 2200a, 2200b, 2200c, and 2200d than the drive control unit 3103. The image processing unit 3102 and the drive control unit 3103 are connected via a cable 3104.

The optical scanning device 2010 configured as described above can cause the light sources 2200a, 2200b, 2200c, and 2200d to emit light corresponding to image data and form latent images.

Figure 9:
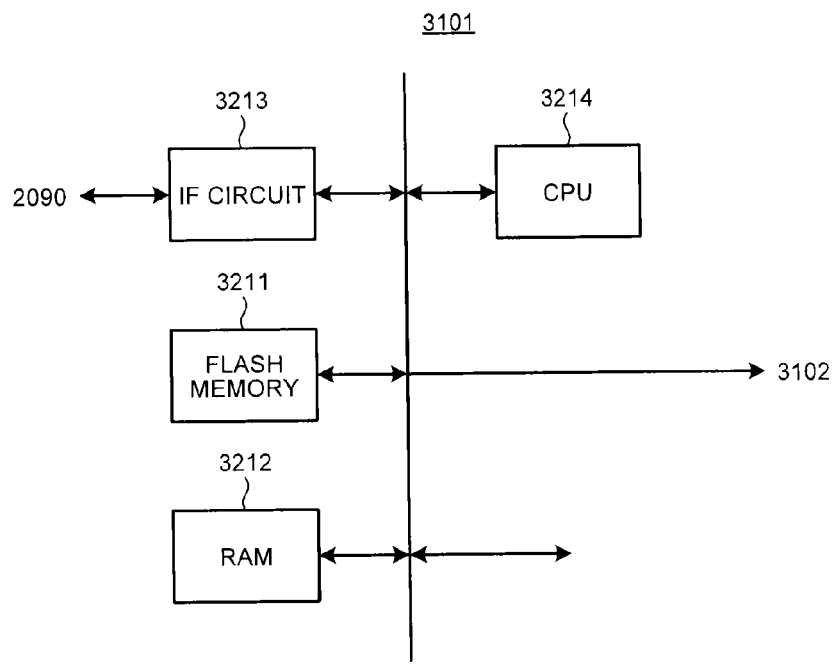
FIG. 9 is a diagram illustrating a configuration of an interface unit.

FIG. 9 is a diagram illustrating a configuration of the interface unit 3101. The interface unit 3101 includes, for example, a flash memory 3211, a RAM 3212, an interface (IF) circuit 3213, and a CPU 3214. The flash memory 3211, the RAM 3212, the IF circuit 3213, and the CPU 3214 are connected via a bus.

The flash memory 3211 stores therein a program executed by the CPU 3214 and various kinds of data necessary for execution of the program by the CPU 3214. The RAM 3212 is a storage area serving as a work area when the CPU 3214 executes the program. The IF circuit 3213 performs bidirectional communication with the printer control device 2090.

The CPU 3214 operates in accordance with the program stored in the flash memory 3211, and controls the entire optical scanning device 2010. The interface unit 3101 configured as described above sends input image data (RGB format, 1200 dpi, 8-bit) transmitted from the printer control device 2090 to the image processing unit 3102.

Figure 10:
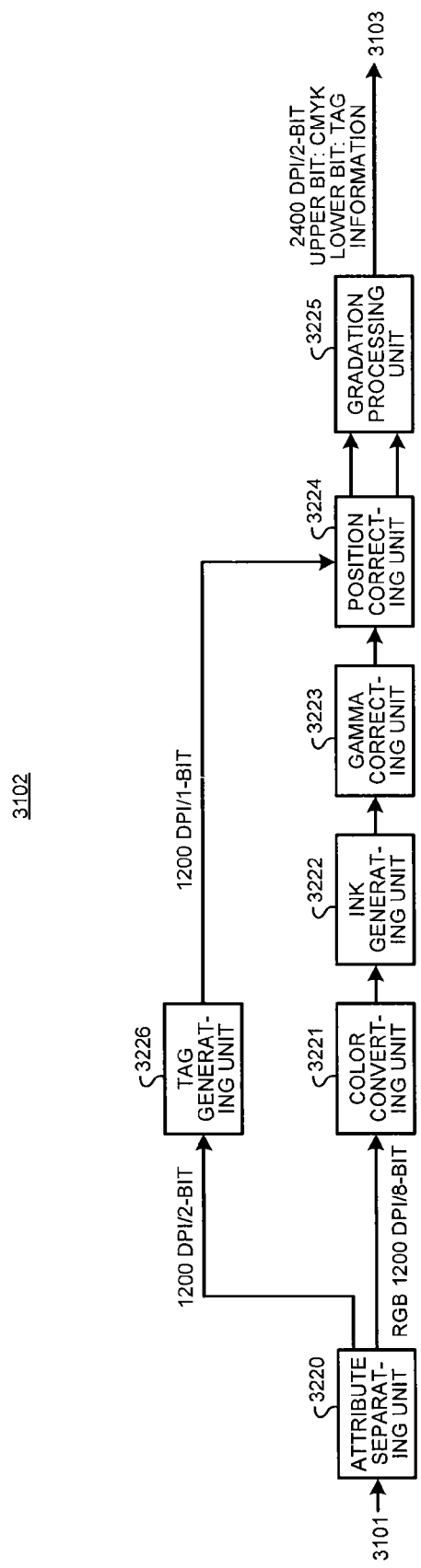
FIG. 10 is a diagram illustrating a configuration of an image processing unit.

FIG. 10 is a diagram illustrating a configuration of the image processing unit 3102. The image processing unit 3102 includes an attribute separating unit 3220, a color converting unit 3221, an ink generating unit 3222, a gamma correcting unit 3223, a position correcting unit 3224, a gradation processing unit 3225, and a tag generating unit 3226.

The attribute separating unit 3220 receives input image data (RGB format, 1200 dpi, 8-bit) from the interface unit 3101. Attribute information is appended to each of pixels of the input image data. The attribute information indicates a type of an object serving as a source of the area (pixel). For example, if a pixel is a part of a character, the attribute information represents an attribute indicating a "character". For example, if a pixel is a part of a line, the attribute information represents an attribute indicating a "line". For example, if a pixel is a part of a graphic, the attribute information represents an attribute indicating a "graphic". For example, if a pixel is a part of a photograph, the attribute information represents an attribute indicating a "photograph".

The attribute separating unit 3220 separates the attribute information and image data from the input image data. The attribute separating unit 3220 sends the separated attribute information and image data to the tag generating unit 3226. The attribute separating unit 3220 sends the image data to the color converting unit 3221. The image data output from the attribute separating unit 3220 is, for example, 8-bit RGB image data of 1200 dpi. Attribute data output from the attribute separating unit 3220 is, for example, data with the same resolution as the image data (1200 dpi) and with the bit number of 2.

The color converting unit 3221 converts the 8-bit RGB image data into 8-bit CMY image data. The ink generating unit 3222 generates a black component from the CMY image data generated by the color converting unit 3221 to generate CMYK image data. The gamma correcting unit 3223 performs linear conversion of the level of each color of the CMYK image data generated by the ink generating unit 3222, by using a table.

The position correcting unit 3224 receives image data from the gamma correcting unit 3223, and removes noise or distortion. The position correcting unit 3224 performs scaling, shifting, or the like to correct the position of the image. At this time, the position correcting unit 3224 converts the resolution from 1200 dpi to 2400 dpi. The position correcting unit 3224 outputs CMYK image data of 2400 dpi (first resolution), in which each pixel is represented by multiple bits (in this example, 8 bits).

The gradation processing unit 3225 receives the 8-bit CMYK image data of 2400 dpi from the position correcting unit 3224. The gradation processing unit 3225 performs pseudo halftone processing, such as dithering and error diffusion processing, to generate 1-bit area coverage modulation data from the 8-bit image data.

The tag generating unit 3226 generates tag information indicating whether or not each of pixels of the image data of 1200 dpi is a pixel of a character or a line. The tag generating unit 3226 generates the tag information based on the attribute information, for example.

In this example, the tag generating unit 3226 assigns tag information indicating a character or a line to a black pixel to which the attribute information indicating a character or a line is appended. Herein, the black pixel is a pixel with a pixel value of 1 when the gradation is reduced to 1 bit, and for which light is emitted from the light source 2200 to the photoconductor drum 2030. A white pixel is a pixel with a pixel value of 0 when the gradation is reduced to 1 bit, and for which light is not emitted from the light source 2200 to the photoconductor drum 2030.

The tag information generated by the tag generating unit 3226 is sent to the drive control unit 3103 via the position correcting unit 3224 and the gradation processing unit 3225. The position correcting unit 3224 performs, on the tag information, the same processes as the process of increasing the resolution of image data from 1200 dpi to 2400 dpi and the process of correcting the position of the image data. Therefore, the position correcting unit 3224 increases the resolution of the tag information from 1200 dpi to 2400 dpi, and assigns the tag information to each of the pixels with the increased resolutions.

The gradation processing unit 3225 transmits 1-bit image data with the first resolution (2400 dpi) and 1-bit tag information with the first resolution (2400 dpi) to the drive control unit 3103. In the embodiment, the gradation processing unit 3225 transfers the image data and the tag information by a single path. More specifically, the gradation processing unit 3225 transmits 2-bit data with the first resolution (2400 dpi), in which an upper bit represents the image data (CMYK) and a lower bit represents the tag information, to the drive control unit 3103.

As described above, the image processing unit 3102 can generate the tag information associated with each of pixels of image data with the first resolution (2400 dpi), and transmit the tag information to the drive control unit 3103. A part or the whole of the image processing unit 3102 may be realized by hardware, or may be realized by causing the CPU to execute a software program.

Figure 11:
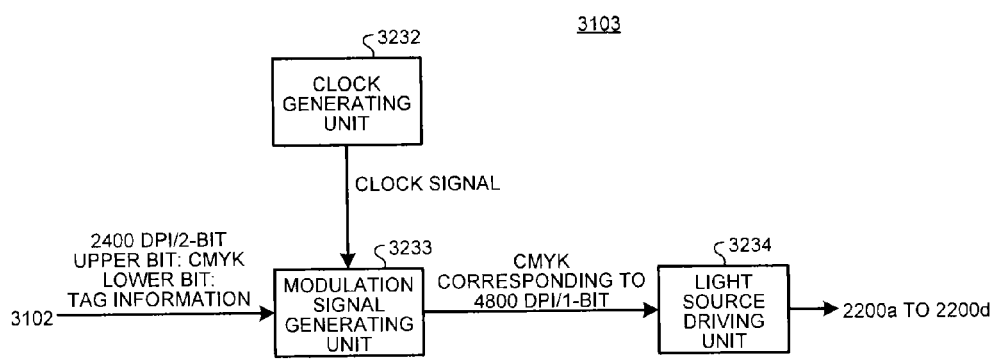
FIG. 11 is a diagram illustrating a configuration of a drive control unit.

FIG. 11 is a diagram illustrating a configuration of the drive control unit 3103. The drive control unit 3103 includes a clock generating unit 3232, a modulation signal generating unit 3233, and a light source driving unit 3234.

The clock generating unit 3232 generates a clock signal indicating a light emission timing for a pixel. The clock signal is a signal, with which image data can be modulated with the resolution corresponding to 4800 dpi.

The modulation signal generating unit 3233 acquires image data with the first resolution from the image processing unit 3102. The modulation signal generating unit 3233 generates image data with the second resolution higher than the first resolution, on the basis of the image data and the tag information with the first resolution. In this example, the modulation signal generating unit 3233 generates 1-bit CMYK image data of 4800 dpi on the basis of 1-bit CMYK image data of 2400 dpi. The modulation signal generating unit 3233 modulates the image data with the second resolution to a clock signal to generate a modulation signal for forming an image of 4800 dpi.

The light source driving unit 3234 receives a modulation signal corresponding to the image data with the second resolution. The light source driving unit 3234 drives the corresponding light source 2200a, 2200b, 2200c, or 2200d in accordance with an independent modulation signal for each color output from the modulation signal generating unit 3233. Therefore, the light source driving unit 3234 can cause each of the light sources 2200a, 2200b, 2200c, and 2200d to emit light with the intensity corresponding to the modulation signal.

Figure 12:
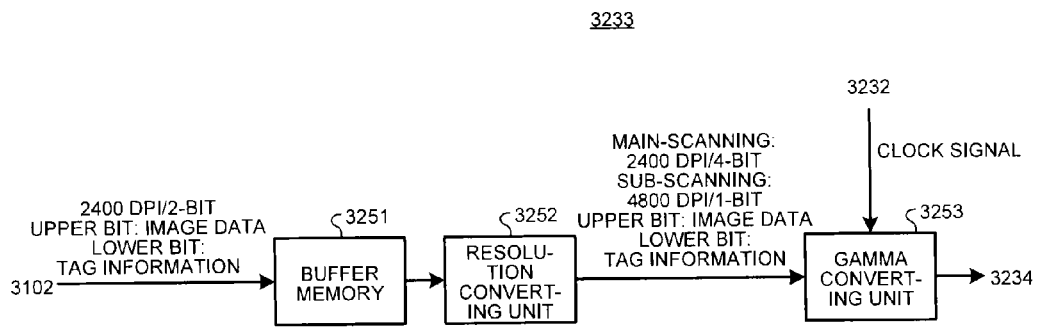
FIG. 12 is a diagram illustrating a configuration of a modulation signal generating unit.

FIG. 12 is a diagram illustrating a configuration of the modulation signal generating unit 3233. The modulation signal generating unit 3233 includes a buffer memory 3251, a resolution converting unit 3252, and a gamma converting unit 3253.

The buffer memory 3251 stores therein 2-bit data with the first resolution (2400 dpi) (an upper bit represents image data (CMYK) and a lower bit represents tag information), sent from the image processing unit 3102. The buffer memory 3251 sends the stored image data and the stored tag information to the resolution converting unit 3252 in response to read by the resolution converting unit 3252 in the subsequent stage.

The resolution converting unit 3252 converts the image data and the tag information with the first resolution, which are stored in the buffer memory 3251, to image data and tag information with the second resolution (corresponding to 4800 dpi and 1-bit) higher than the first resolution. In the embodiment, the resolution converting unit 3252 converts image data to data of 2400 dpi and 4-bit (upper bits represent image data (CMYK) and lower bits represent tag information) in the main-scanning direction and of 4800 dpi and 1-bit in the sub-scanning direction.

The resolution converting unit 3252 sequentially selects target pixels from the image data with the first resolution, and performs a resolution conversion process on each of the target pixels. The resolution converting unit 3252 sends the image data with the second resolution after the conversion to the gamma converting unit 3253.

The gamma converting unit 3253 receives the image data with the second resolution from the resolution converting unit 3252, modulates the received image to a clock signal, and converts a level to a level corresponding to the characteristics of the light source 2200 to generate a modulation signal. The gamma converting unit 3253 sends the generated modulation signal to the light source driving unit 3234.

Figure 13:
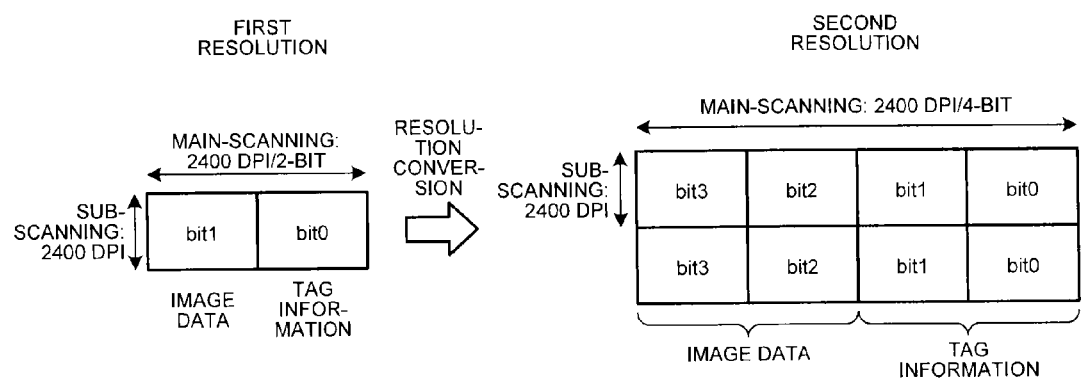
FIG. 13 is a diagram illustrating a layout of bits of image data and tag information with a first resolution (2400 dpi) before resolution conversion, and a layout of bits of image data and tag information with a second resolution (4800 dpi) after the resolution conversion.

FIG. 13 is a diagram illustrating a layout of bits of image data and tag information with the first resolution (2400 dpi) before the resolution converting unit 3252 performs resolution conversion, and a layout of bits of image data and tag information with the second resolution (4800 dpi) after the resolution conversion.

In the embodiment, data with the first resolution is represented by 2400 dpi and 2-bit in the main-scanning direction and 2400 dpi and 1-bit in the sub-scanning direction. In the data of 2-bit in the main-scanning direction, an upper bit (a bit 1) represents image data (CMYK) and a lower bit (a bit 0) represents tag information.

In the embodiment, data with the second resolution is represented by 2400 dpi and 4-bit in the main-scanning direction and 4800 dpi and 1-bit in the sub-scanning direction. In the data of 4-bit in the main-scanning direction, upper bits (a bit 3 and a bit 2) represent image data (CMYK) and lower bits (a bit 1 and a bit 0) represent tag information. The data with the second resolution is 2400 dpi in the main-scanning direction. However, because the bit number of the data with the second resolution in the main-scanning direction is twice the bit number of the data with the first resolution, the data with the second resolution corresponds to 4800 dpi and 2-bit.

Figure 14:
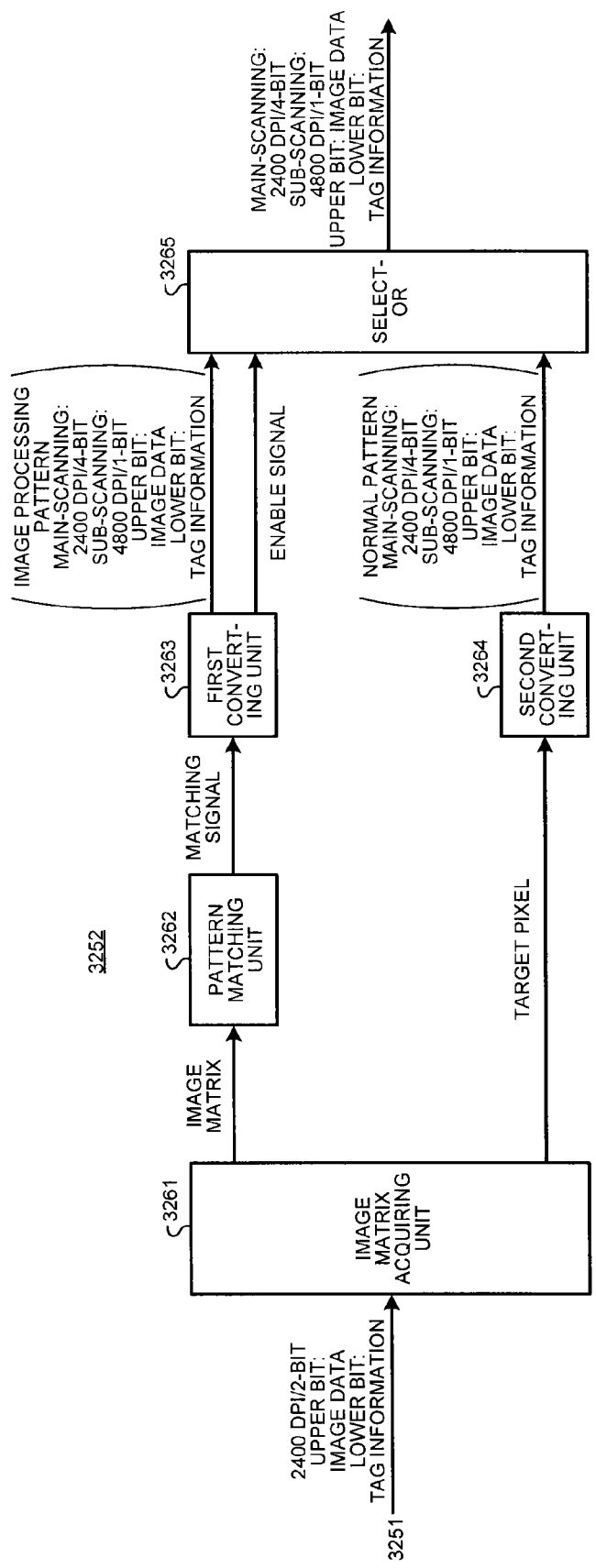
FIG. 14 is a diagram illustrating a configuration of a resolution converting unit.

FIG. 14 is a diagram illustrating a configuration of the resolution converting unit 3252. In the embodiment, the resolution converting unit 3252 sequentially selects target pixels one by one from the image data with the first resolution (2400 dpi), and performs the conversion process as illustrated in FIG. 13 on each of the target pixels.

The resolution converting unit 3252 includes an image matrix acquiring unit 3261, a pattern matching unit 3262, a first converting unit 3263, a second converting unit 3264, and a selector 3265.

The image matrix acquiring unit 3261 detects an image matrix from the buffer memory 3251. The image matrix is image data and tag information with the first resolution in an area containing a target pixel and pixels around the target pixel. For example, the image matrix is image data and tag information with the first resolution in a rectangular area with the target pixel in the center. In the embodiment, the image matrix is image data and tag information with the first resolution in a 9×9 pixel area with the target pixel in the center.

The pattern matching unit 3262 determines whether or not the target pixel is a pixel of a character or an edge of a line on the basis of a layout of the image data and the tag information in the image matrix. The pixel of the edge is a pixel in the vicinity of the boundary between a black pixel and a white pixel. For example, the pixel of the edge is a pixel in a predetermined range from the boundary between a black pixel and a white pixel.

For example, if the layout of the image data and the tag information in the image matrix matches any of patterns registered in advance, the pattern matching unit 3262 determines that the target pixel is a pixel of a character or an edge of a line. If the layout does not match any of the patterns, the pattern matching unit 3262 determines that the target pixel is not a pixel of a character or an edge of a line.

The pattern matching unit 3262, when determining that the target pixel is a pixel of a character or an edge of a line, sends a matching signal for discriminating the layout of the image data and the tag information in the image matrix to the first converting unit 3263. The pattern matching unit 3262, when determining that the target pixel is not a pixel of a character or an edge of a line, does not send the matching signal to the first converting unit 3263.

The first converting unit 3263, when the target pixel is a pixel of a character or an edge of a line, converts the image data and the tag information on the target pixel to image data and tag information with the second resolution of a pattern that is determined in accordance with the layout in the image matrix. In the embodiment, the first converting unit 3263 outputs, as the image data and the tag information with the second resolution, data of 2400 dpi and 4-bit in the main-scanning direction and of 4800 dpi and 1-bit in the sub-scanning direction.

For example, the first converting unit 3263 converts the target pixel to image data and tag information with the second resolution of a pattern subjected to image processing for thinning a character or a line. For example, the first converting unit 3263 converts the target pixel to image data and tag information with the second resolution of a pattern subjected to image processing for thickening an outline character or a line. After performing the conversion, the first converting unit 3263 sends the pattern subjected to the image processing (image processed pattern) and an enable signal to the selector 3265.

The second converting unit 3264, when the target pixel is not a pixel of a character or an edge of a line, performs conversion to image data and tag information with the second resolution of a pattern corresponding to a value of the target pixel. Specifically, the second converting unit 3264 converts the target pixel to image data and tag information with the second resolution of a pattern (normal pattern) that is not subjected to image processing. In the embodiment, the second converting unit 3264 outputs, as the image data and the tag information with the second resolution, data of 2400 dpi and 4-bit in the main-scanning direction and of 4800 dpi and 1-bit in the sub-scanning direction. The second converting unit 3264 sends the normal pattern to the selector 3265.

The selector 3265 receives the image processed pattern and the enable signal from the first converting unit 3263. The selector 3265 receives the normal pattern from the second converting unit 3264. The selector 3265, when receiving the enable signal (that is, when the target pixel is a pixel of a character or an edge of a line), outputs the image processed pattern. The selector 3265, when not receiving the enable signal (that is, when the target pixel is not a pixel of a character or an edge of a line), outputs the normal pattern.

The resolution converting unit 3252 configured as described above can convert image data with the first resolution to image data with the second resolution, and perform image processing on a character or an edge of a line. For example, the resolution converting unit 3252 can thin a character or a line, generate an outline character, or thicken a line.

Specific examples of processes performed by each component

Processes performed by each component will be described in detail by using image data or the like.

Figure 15:
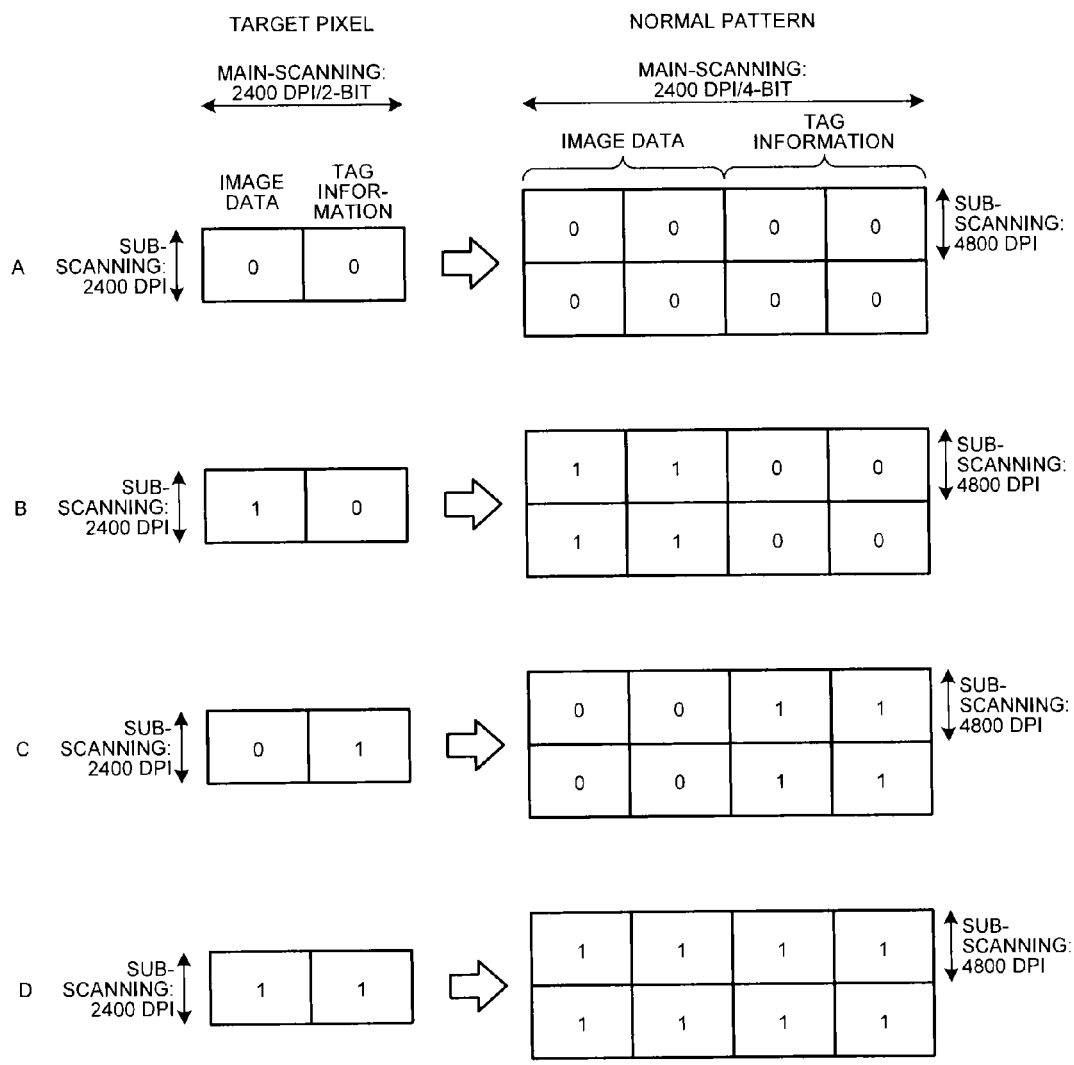
FIG. 15 is a diagram illustrating a target pixel with the first resolution (2400 dpi), and image data and tag information with the second resolution (4800 dpi) after conversion to a normal pattern.

FIG. 15 is a diagram illustrating a target pixel with the first resolution (2400 dpi), and image data and tag information with the second resolution (4800 dpi) after conversion to the normal pattern. The second converting unit 3264 converts the target pixel to image data and tag information with the second resolution of a pattern corresponding to a value of the target pixel.

For example, as illustrated in a section A of FIG. 15, if a target pixel has image data of 0 and tag information of 0, the second converting unit 3264 outputs data in which portions of the image data in the main-scanning direction (upper 2 bits) are set to 0 and portions of the tag information (lower 2 bits) are set to 0. As illustrated in a section B of FIG. 15, if the target pixel has image data of 1 and tag information of 0, the second converting unit 3264 outputs data in which portions of the image data in the main-scanning direction (upper 2 bits) are set to 1 and portions of the tag information (lower 2 bits) are set to 0. As illustrated in a section C of FIG. 15, if the target pixel has image data of 0 and tag information of 1, the second converting unit 3264 outputs data in which portions of the image data in the main-scanning direction (upper 2 bits) are set to 0 and portions of the tag information (lower 2 bits) are set to 1. As illustrated in a section D of FIG. 15, if the target pixel has image data of 1 and tag information of 1, the second converting unit 3264 outputs data in which portions of the image data in the main-scanning direction (upper 2 bits) are set to 1 and portions of the tag information (lower 2 bits) are set to 1.

Figure 16:
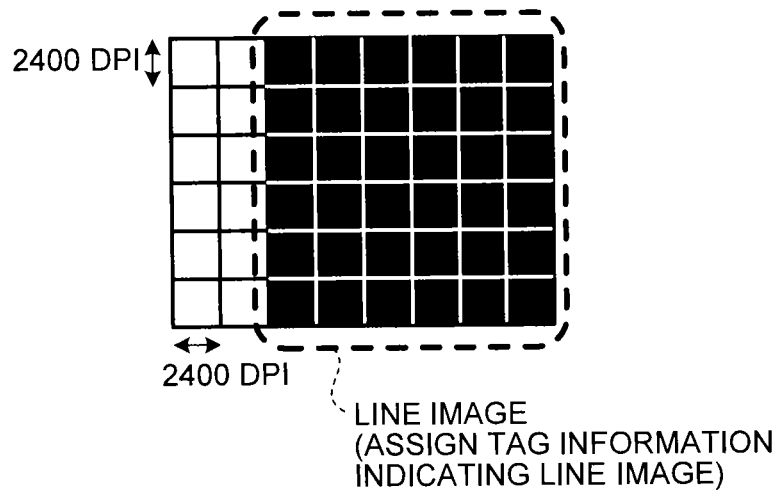
FIG. 16 is a diagram illustrating an example of a line image with black pixels of 2400 dpi.

FIG. 16 is a diagram illustrating an example of a line image with black pixels of 2400 dpi. In the input image data, the attribute information (a type of an object serving as a source of a pixel) is appended to each of the pixels. For example, in the example in FIG. 16, attribute information indicating that an object serving as a source is a line image (a character and a line may be referred to as "a line image") is appended to black pixels. In this example, if a pixel is a black pixel and the attribute information represents a pixel indicating a line image, the tag generating unit 3226 assigns tag information indicating a line image to the pixel.

The tag generating unit 3226 generates tag information with the resolution of 1200 dpi because the input image data has the resolution of 1200 dpi. The position correcting unit 3224 corrects the position of the input image data with the resolution of 1200 dpi, and increases the resolution to 2400 dpi (first resolution). In this case, the position correcting unit 3224 corrects the position of the tag information and increases the resolution to 2400 dpi (first resolution) in synchronization with the input image data.

Figure 17:
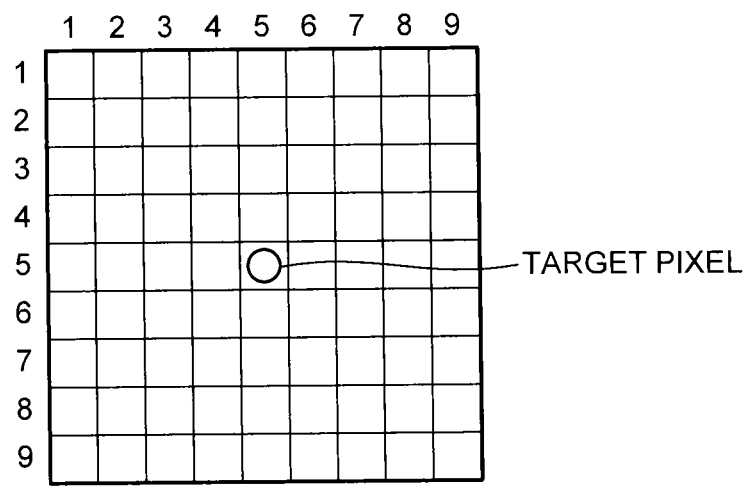
FIG. 17 is a diagram illustrating an example of a shape and a size of an image matrix.

FIG. 17 is a diagram illustrating an example of the image matrix. In the embodiment, as illustrated in FIG. 17, the image matrix acquiring unit 3261 acquires an image matrix of a 9×9 pixel area (the main-scanning direction×the sub-scanning direction) with a target pixel in the center.

Figure 19:
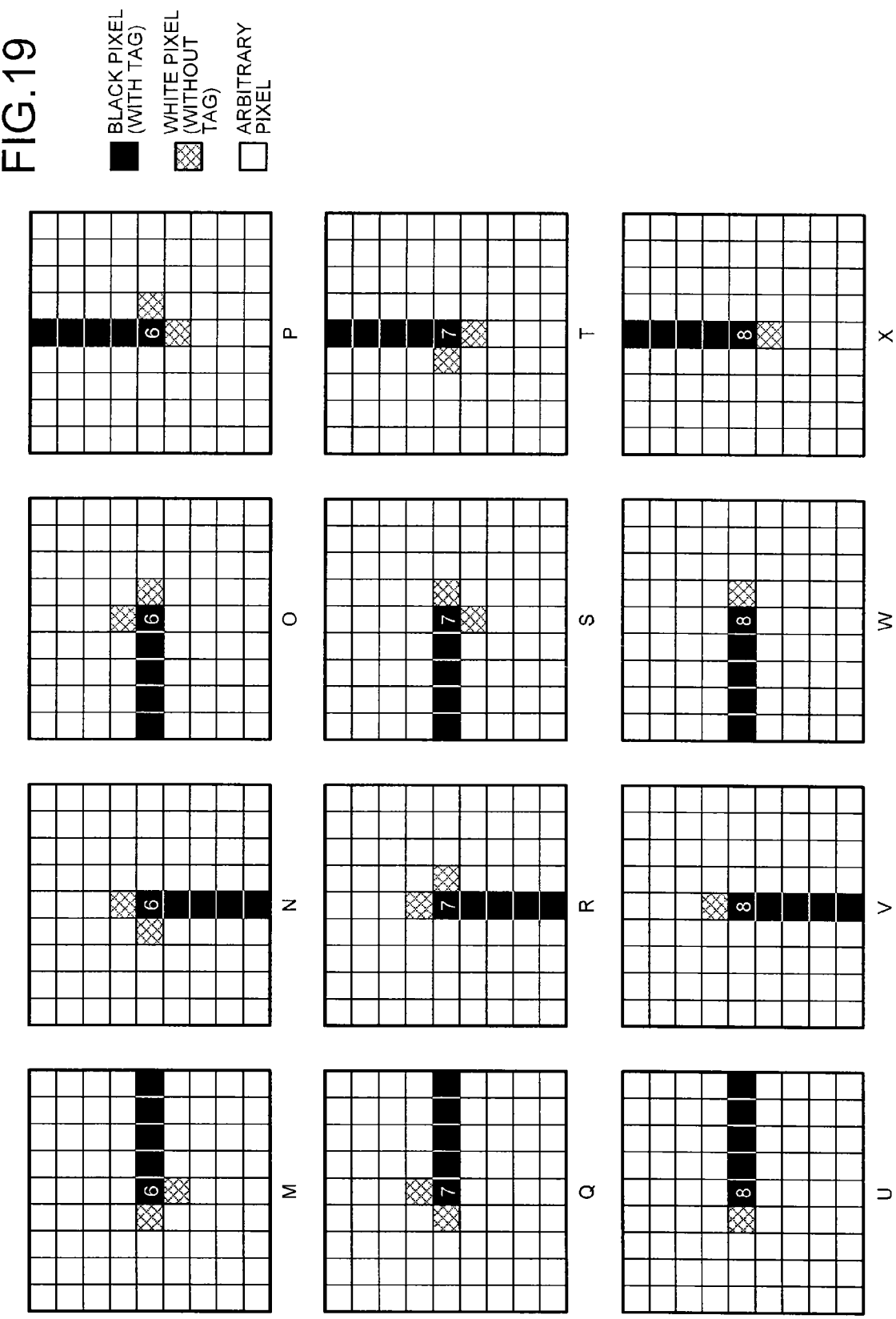
FIG. 19 is a diagram illustrating a second example of layouts of image matrices for determining whether a target pixel is a pixel of an edge of a line image.
Figure 20:
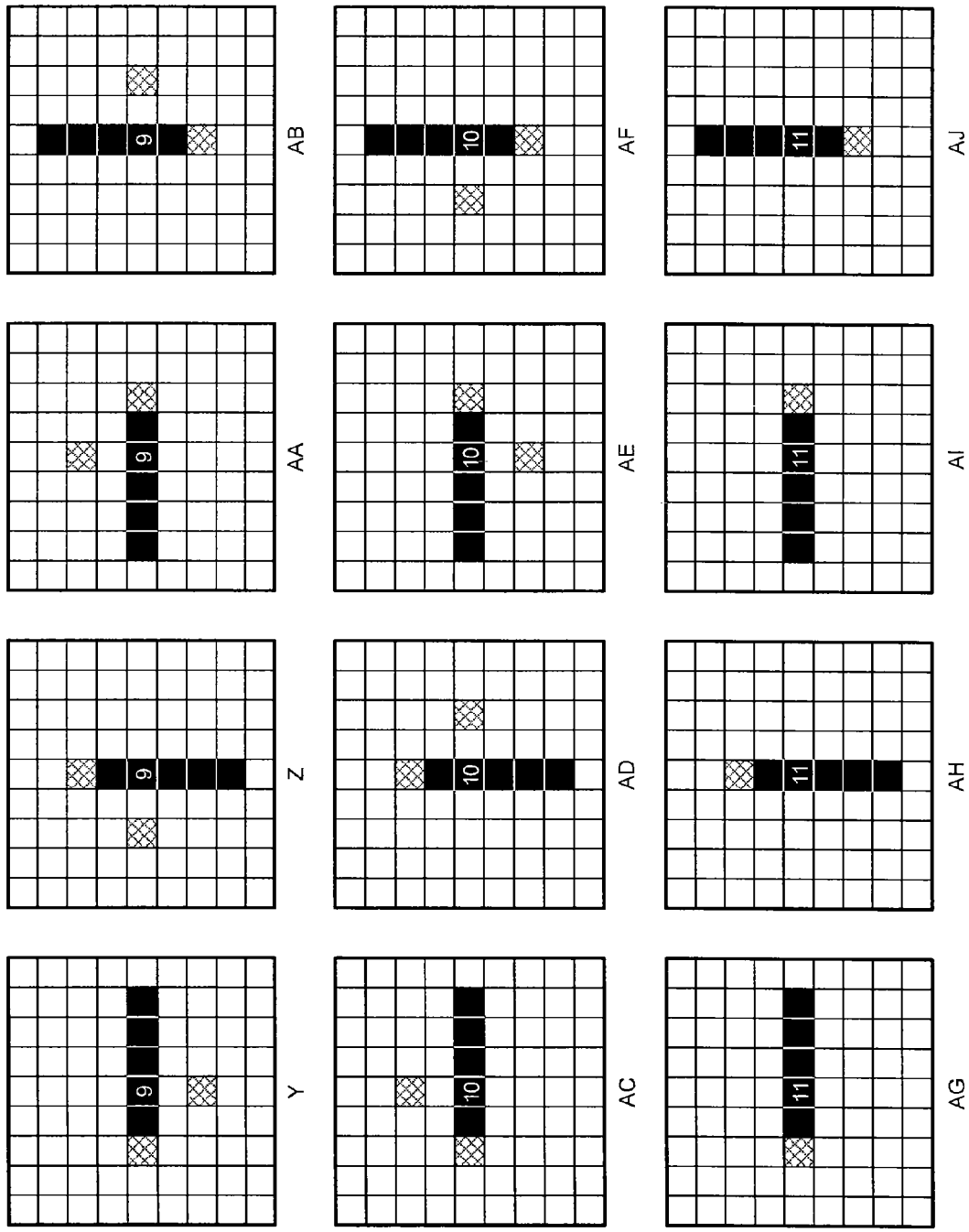
FIG. 20 is a diagram illustrating a third example of layouts of image matrices for determining whether a target pixel is a pixel of an edge of a line image.

FIGS. 18, 19, and 20 are diagrams illustrating examples of layouts of image matrixes for determining whether a target pixel is a pixel of an edge of a line image. When the layout of the image data and the tag information in the acquired image matrix matches any of layouts A to L in FIG. 18, layouts M to X in FIG. 19, and layouts Y to AJ in FIG. 20, the pattern matching unit 3262 determines that the target pixel is the edge of the line image.

In FIGS. 18, 19, and 20, black portions indicate black pixels each appended with tag information indicating that the pixel is a line image, shaded portions indicate white pixels each appended with tag information indicating that the pixel is not a line image, and blank portions indicate arbitrary pixels (pixels of any image data and any tag information).

In the examples in FIGS. 18 to 20, the edge of the line image corresponds to pixels in a black area within a predetermined range from the boundary between a black pixel and a white pixel. In this example, the edge of the line image corresponds to black pixels within a range of two pixels from the boundary between a black pixel and a white pixel.

In FIG. 18, A, B, C, and D represent layouts, in each of which a target pixel (a pixel denoted by 1 or 2) serves as an edge of a line or a character with the width of two pixels. In FIG. 18, E, F, G, and H represent layouts, in each of which a target pixel (a pixel denoted by 3 or 4) serves as an edge located adjacent to a white pixel in a line or a character with the width of four pixels. In FIG. 18, I, J, K, and L represent layouts, in each of which a target pixel (a pixel denoted by 5) serves as an edge located distant from a white pixel by one pixel in a line or a character with the width of four pixels.

In FIG. 19, M, N, O, P, Q, R, S, and T represent layouts, in each of which a target pixel (a pixel denoted by 6 or 7) serves as an edge located adjacent to a white pixel at the corner of a line or a character. In FIG. 19, U, V, W, and X represent layouts, in each of which a target pixel (a pixel denoted by 8) serves as an edge located adjacent to a white pixel in a line or a character with the width of four or more pixels.

In FIG. 20, Y, Z, AA, AB, AC, AD, AE, and AF represent layouts, in each of which a target pixel (a pixel denoted by 9 or 10) serves as an edge located distant from a while pixel by one pixel at the corner of a line or a character. In FIG. 20, AG, AH, AI, and AJ represent layouts, in each of which a target pixel (a pixel denoted by 11) serves as an edge located distant from a white pixel by one pixel in a line or a character with the width of four or more pixels.

Figure 21:
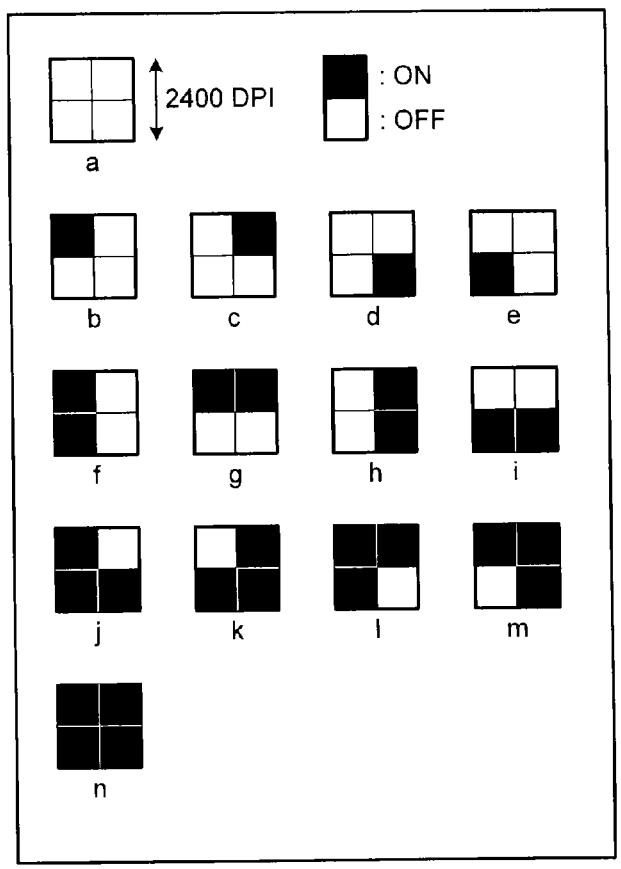
FIG. 21 is a diagram illustrating an example of patterns after conversion.

FIG. 21 is a diagram illustrating an example of patterns after conversion to the second resolution. When the acquired image matrix matches any of the layouts illustrated in FIGS. 18 to 20, the first converting unit 3263 converts the target pixel in the center to any of patterns a to n with the second resolution illustrated in FIG. 21.

The pattern a is a pattern, in which all of 2×2 pixels are set to OFF (not illuminated).

The pattern b is a pattern, in which one pixel on the upper left of 2×2 pixels is set to ON (illuminated). The pattern c is a pattern, in which one pixel on the upper right of 2×2 pixels is set to ON. The pattern d is a pattern, in which one pixel on the lower right of 2×2 pixels is set to ON. The pattern e is a pattern, in which the lower left of 2×2 pixels is set to ON.

The pattern f is a pattern, in which two pixels on the upper left and the lower left of 2×2 pixels are set to ON. The pattern g is a pattern, in which two pixels on the upper left and the upper right of 2×2 pixels are set to ON. The pattern h is a pattern, in which two pixels on the upper right and the lower right of 2×2 pixels are set to ON. The pattern i is a pattern, in which two pixels on the lower left and the lower right of 2×2 pixels are set to ON.

The pattern j is a pattern, in which three pixels on the upper left, the lower left, and the lower right of 2×2 pixels are set to ON. The pattern k is a pattern, in which three pixels on the lower left, the upper right, and the lower right of 2×2 pixels are set to ON. The pattern l is a pattern, in which three pixels on the upper left, the lower left, and the upper right of 2×2 pixels are set to ON. The pattern m is a pattern, in which three pixels on the upper left, the upper right, and the lower right of 2×2 pixels are set to ON.

The pattern n is a pattern, in which all of 2×2 pixels are set to ON.

Figure 22:
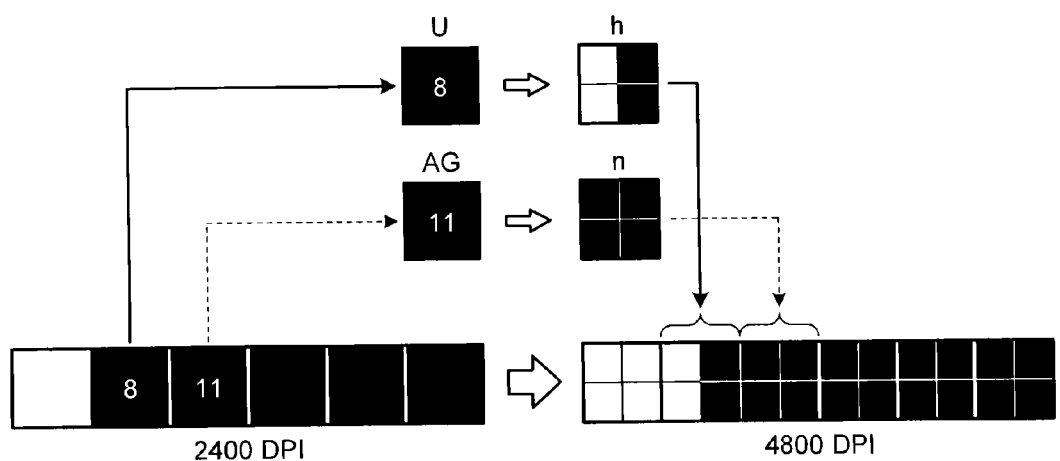
FIG. 22 is a diagram illustrating a first modification for increasing resolutions of target pixels contained in an image matrix U in FIG. 19 and an image matrix AG in FIG. 20.

FIG. 22 is a diagram illustrating a first modification for increasing the resolutions of target pixels contained in the image matrix U in FIG. 19 and the image matrix AG in FIG. 20. The first converting unit 3263 registers therein, in advance, which of the patterns illustrated in FIG. 21 is used to convert a target pixel, for each of the layouts of the image matrices illustrated in FIGS. 18, 19, and 20. For example, in the first converting unit 3263, a pattern that narrows a line image inward is registered. With this, the first converting unit 3263 can thin a line image by thinning a black area in the line image.

For example, as illustrated in FIG. 22, if the layout of the image matrix corresponds to the image matrix U in FIG. 19, the first converting unit 3263 replaces a target pixel (a pixel located at a position denoted by 8) with the pattern h in FIG. 21. If the layout of the image matrix corresponds to the image matrix AG in FIG. 20, the first converting unit 3263 replaces a target pixel (a pixel located at a position denoted by 11) with the pattern n in FIG. 21. Therefore, the first converting unit 3263 can thin the black area by reducing the black pixels on the left edge by one pixel with the second resolution (4800 dpi).

Figure 23:
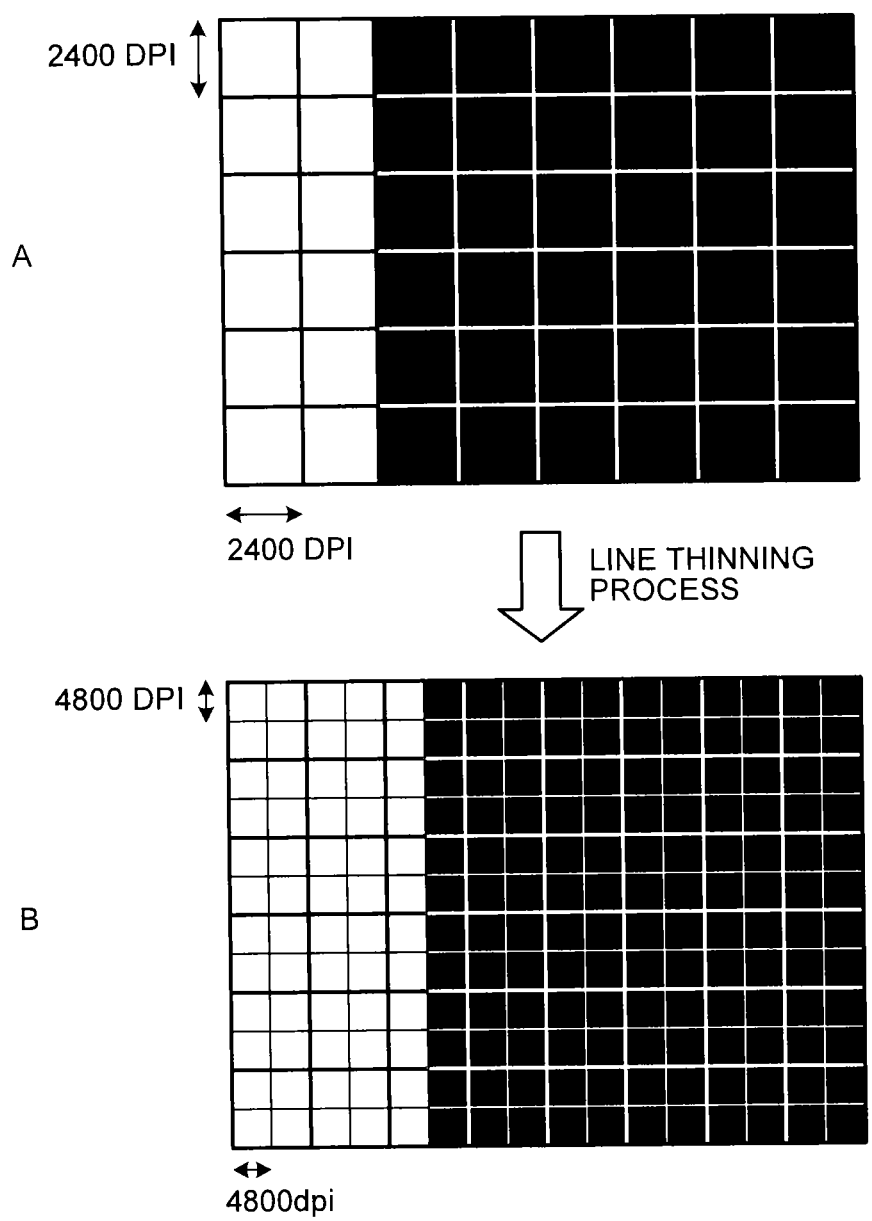
FIG. 23 is a diagram illustrating an example of a line image with black pixels of 2400 dpi and a line image with black pixels with an increased resolution of 4800 dpi.

FIG. 23 is a diagram illustrating an example of a line image with black pixels of 2400 dpi and a line image with black pixels with the increased resolution of 4800 dpi. For example, the resolution converting unit 3252 as described above can convert image data of a part of a line or a character with black pixels of 2400 dpi as illustrated in A of FIG. 23 to image data with the resolution of 4800 dpi as illustrated in B of FIG. 23. The resolution converting unit 3252 can thin a part of a black line or a black character as illustrated in B of FIG. 23.

Figure 24:
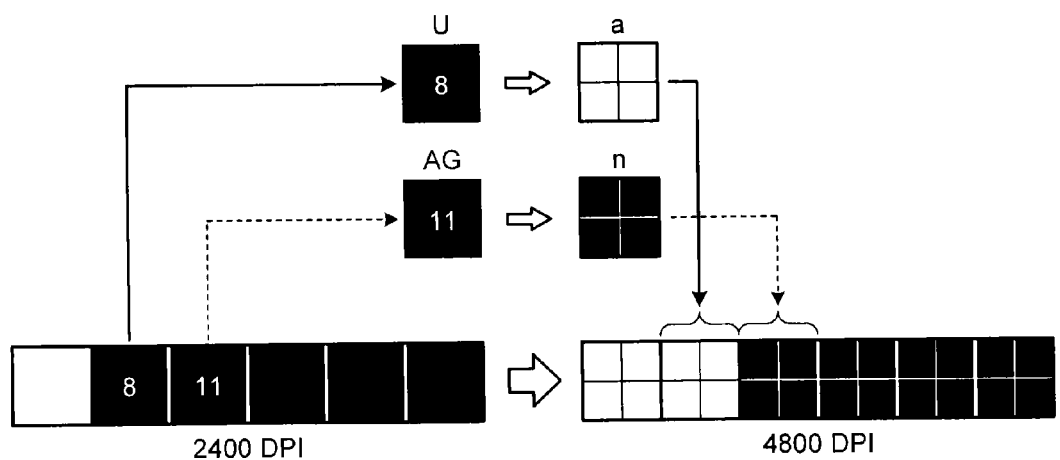
FIG. 24 is a diagram illustrating a second modification for increasing the resolutions of the target pixels contained in the image matrix U in FIG. 19 and the image matrix AG in FIG. 20.
Figure 25:
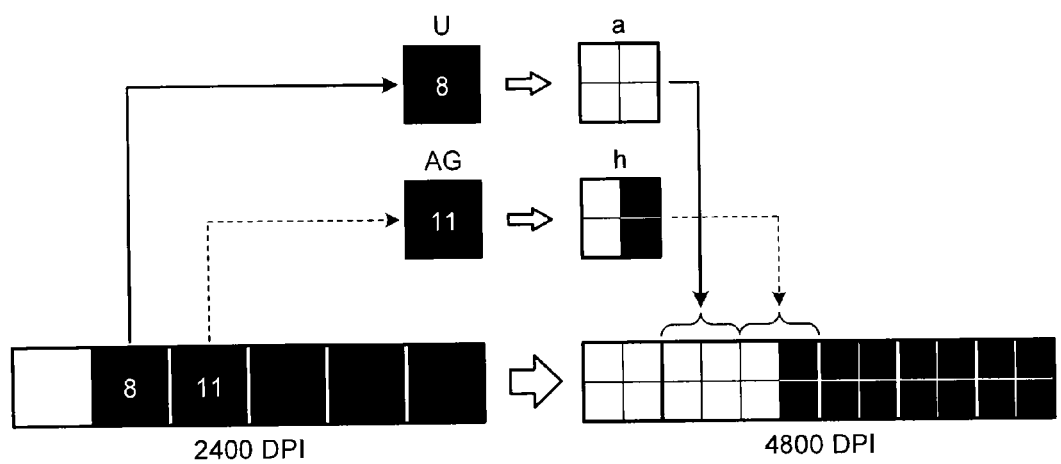
FIG. 25 is a diagram illustrating a third modification for increasing the resolutions of the target pixels contained in the image matrix U in FIG. 19 and the image matrix AG in FIG. 20.

FIG. 24 is a diagram illustrating a second modification for increasing the resolutions of the target pixels contained in the image matrix U in FIG. 19 and the image matrix AG in FIG. 20. FIG. 25 is a diagram illustrating a third modification for increasing the resolutions of the target pixels contained in the image matrix U in FIG. 19 and the image matrix AG in FIG. 20.

The first converting unit 3263 can further thin the black area by changing association between the layout of the image matrix and each of the patterns in FIG. 21.

For example, as illustrated in FIG. 24, if the layout of the image matrix corresponds to the image matrix U in FIG. 19, the first converting unit 3263 converts a target pixel (a pixel located at a position denoted by 8) with the pattern a in FIG. 21. If the layout of the image matrix corresponds to the image matrix AG in FIG. 20, the first converting unit 3263 converts a target pixel (a pixel located at a position denoted by 11) with the pattern n in FIG. 21. Therefore, the first converting unit 3263 can thin the black area by reducing black pixels on the left edge by two pixels with the second resolution (4800 dpi).

For example, as illustrated in FIG. 25, if the layout of the image matrix corresponds to the image matrix U in FIG. 19, the first converting unit 3263 converts a target pixel (a pixel located at a position denoted by 8) with the pattern a in FIG. 21. If the layout of the image matrix corresponds to the image matrix AG in FIG. 20, the first converting unit 3263 converts a target pixel (a pixel located at a position denoted by 11) with the pattern h in FIG. 21. Therefore, the first converting unit 3263 can thin the black area by reducing black pixels on the left edge by three pixels with the second resolution (4800 dpi).

Figure 26:
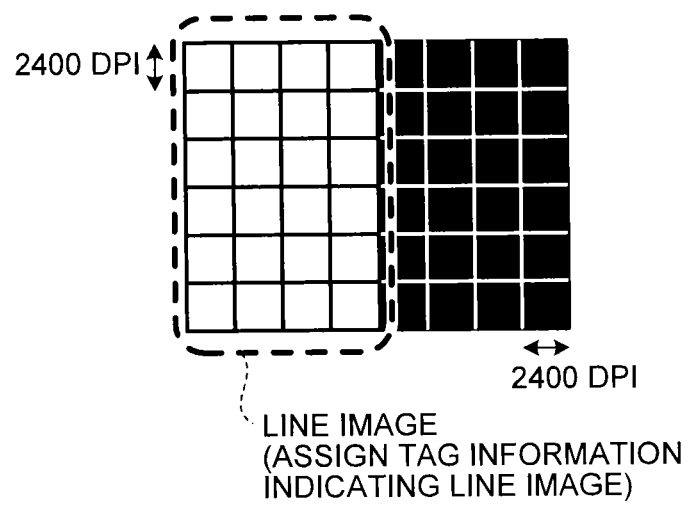
FIG. 26 is a diagram illustrating an example of an outline line image of 2400 dpi.

FIG. 26 is a diagram illustrating an example of an outline line image of 2400 dpi. For example, in the example in FIG. 26, attribute information indicating that an object serving as a source is a line image is appended to white pixels. In this example, if a pixel is a white pixel and the attribute information represents a pixel indicating a line image, the tag generating unit 3226 assigns tag information indicating a line image to the pixel. Therefore, the tag generating unit 3226 can assign the tag information indicating a character or a line to an outline image.

Figure 27:
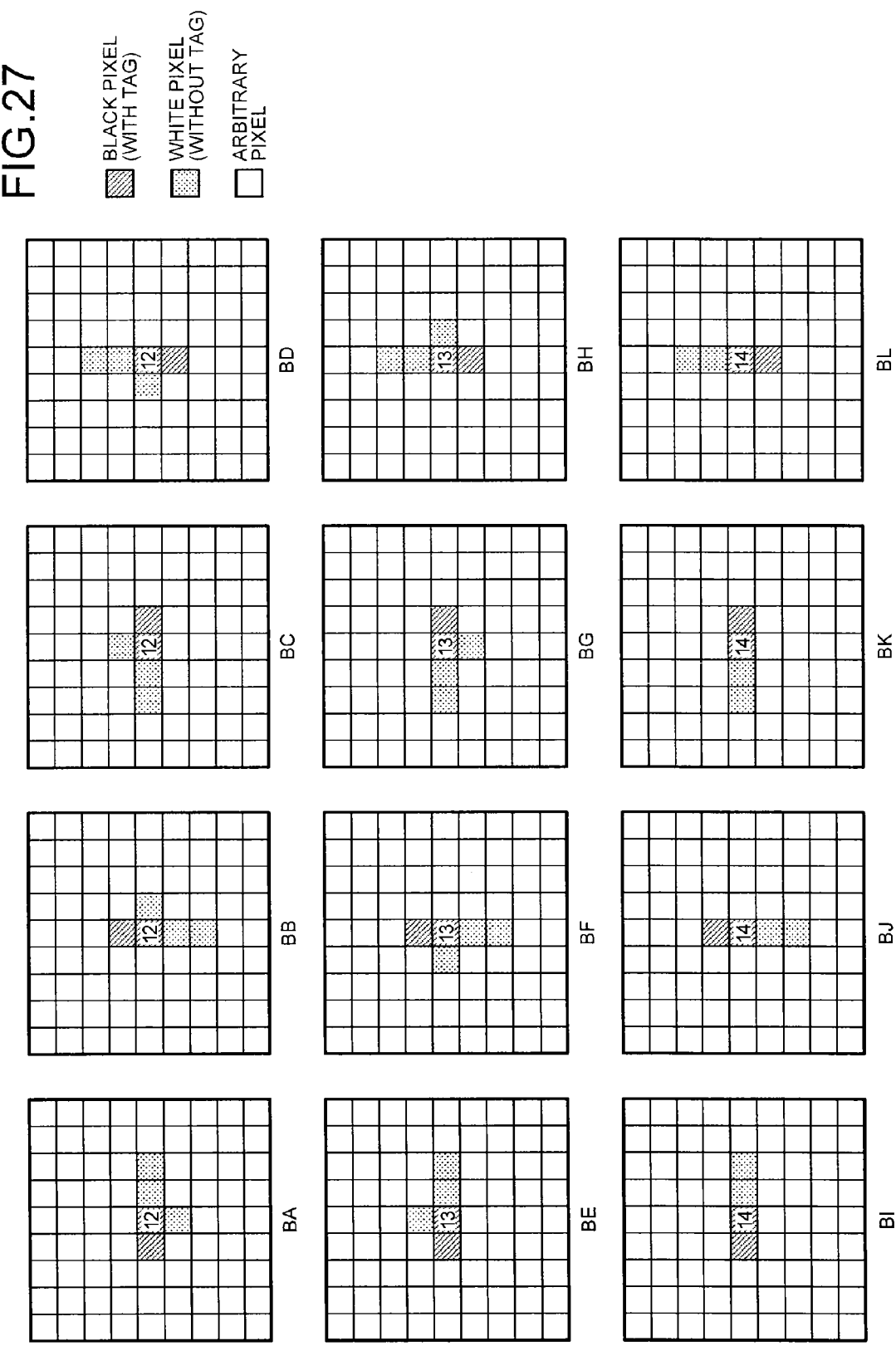
FIG. 27 is a diagram illustrating a first example of layouts of image matrices for determining whether a target pixel is a pixel of an edge of an outline line image.

FIGS. 27 and 28 are diagrams illustrating examples of layouts of image matrices for determining whether a target pixel is a pixel of an edge of an outline line image. If the layout of the image data and the tag information of the acquired image matrix matches any of layouts BA to BL in FIG. 27 and layouts BM to BX in FIG. 28, the pattern matching unit 3262 determines that a target pixel is a pixel of the edge of the line image.

In FIGS. 27 and 28, black portions indicate black pixels each appended with tag information indicating that a pixel is not a line image, shaded portions indicate white pixels each appended with tag information indicating that a pixel is a line image, and blank portions indicate arbitrary pixels (pixels of any image data and any tag information).

The edge of the outline line image corresponds to pixels in a black area within a predetermined range from the boundary between a black pixel and a white pixel. In this example, the edge of the outline line image corresponds to black pixels within a range of two pixels from the boundary between a black pixel and a white pixel.

In FIG. 27, BA, BB, BC, BD, BE, BF, BG, and BH represent layouts, in each of which a target pixel (a pixel denoted by 12 or 13) serves as an edge located adjacent to a white pixel at the corner of an outline line or an outline character. In FIG. 27, BI, BJ, BK, and BL represent layouts, in each of which a target pixel (a pixel denoted by 14) serves as an edge located adjacent to a white pixel in an outline line or an outline character.

In FIG. 28, BM, BN, BO, BP, BQ, BR, BS, and BT represent layouts, in each of which a target pixel (a pixel denoted by 15 or 16) serves as an edge located distant from a white pixel by one pixel at the corner of an outline line or an outline character. In FIG. 28, BU, BV, BW, and BX represent layouts, in each of which a target pixel (a pixel denoted by 17) serves as an edge located distant from a white pixel by one pixel in an outline line or an outline character.

Figure 29:
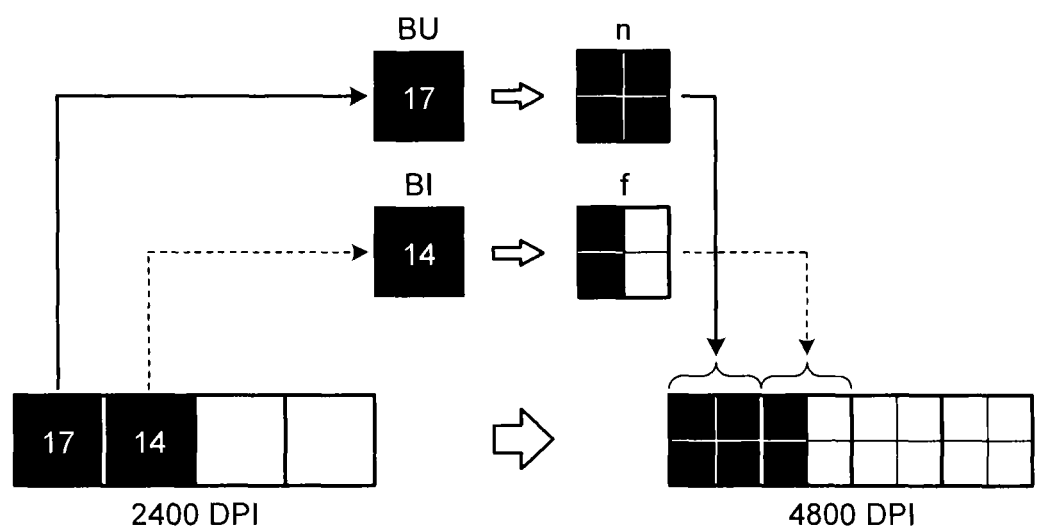
FIG. 29 is a diagram illustrating an example of conversion to increase resolutions of target pixels contained in an image matrix BI in FIG. 27 and an image matrix BU in FIG. 28.

FIG. 29 is a diagram illustrating an example of conversion to increase the resolutions of target pixels contained in the image matrix BI in FIG. 27 and the image matrix BU in FIG. 28. The first converting unit 3263 registers therein, in advance, which of the patterns illustrated in FIG. 21 is used to convert a target pixel, for each of the layouts of the image matrices illustrated in FIGS. 27 and 28. For example, in the first converting unit 3263, a pattern that widens an outline line image outward is registered. With this, the first converting unit 3263 can thicken a line image by thickening a white area in the outline line image.

For example, as illustrated in FIG. 29, if the layout of the image matrix corresponds to the image matrix BI in FIG. 27, the first converting unit 3263 replaces a target pixel (a pixel located at a position denoted by 14) with the pattern f in FIG. 21. If the layout of the image matrix corresponds to the image matrix BU in FIG. 28, the first converting unit 3263 replaces a target pixel (a pixel located at a position denoted by 17) with the pattern n in FIG. 21. Therefore, the first converting unit 3263 can thicken the outline area by reducing the black pixels on the right edge by one pixel with the second resolution (4800 dpi).

Figure 30:
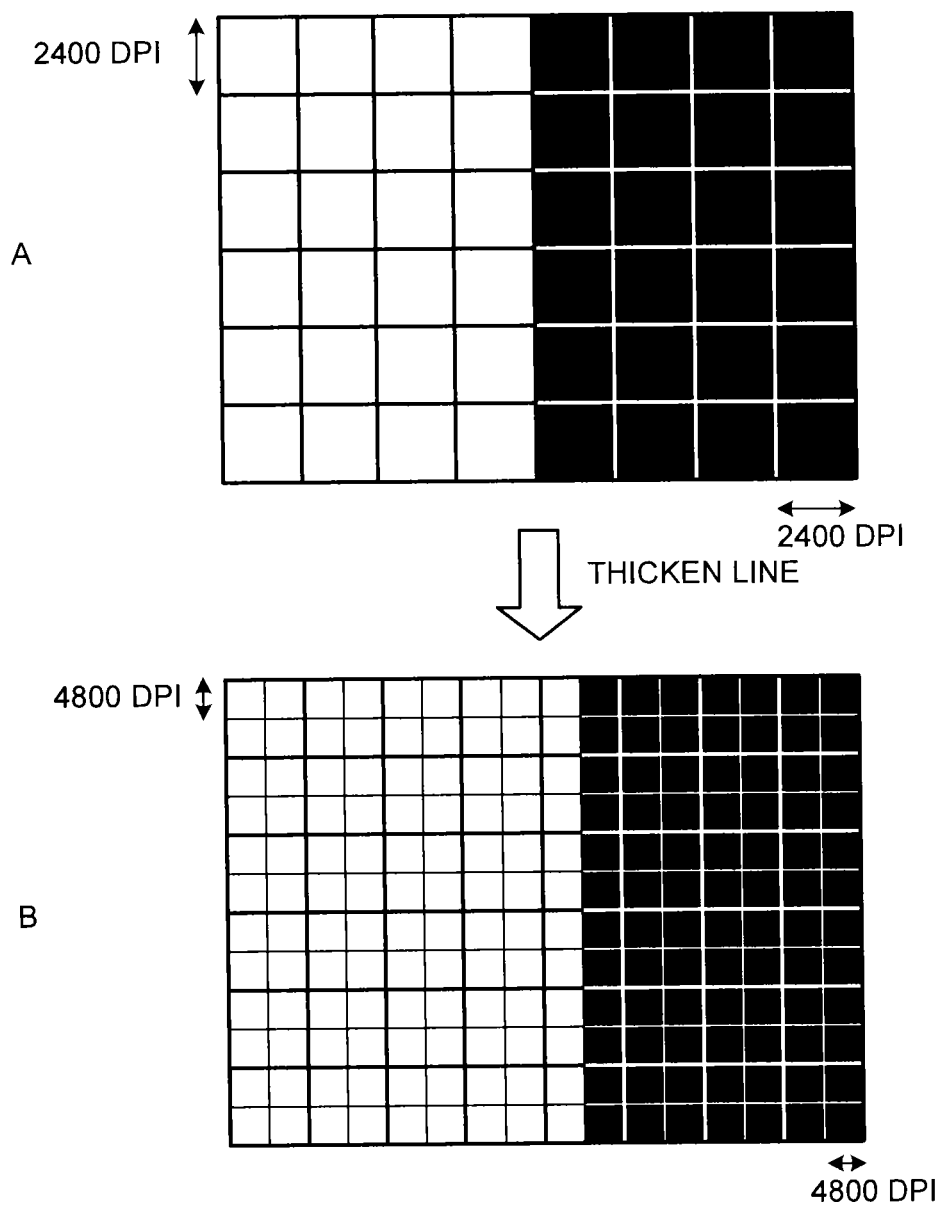
FIG. 30 is a diagram illustrating an example of an outline line image of 2400 dpi and an outline line image with an increased resolution of 4800 dpi.

FIG. 30 is a diagram illustrating an example of an outline line image of 2400 dpi and an outline line image with the increased resolution of 4800 dpi. For example, the resolution converting unit 3252 as described above can convert image data of a part of an outline line or an outline character of 2400 dpi as illustrated in a section A of FIG. 30 to image data with the resolution of 4800 dpi as illustrated in a section B of FIG. 30. The resolution converting unit 3252 can thicken a part of an outline line or an outline character as illustrated in B in FIG. 30.

Figure 31:
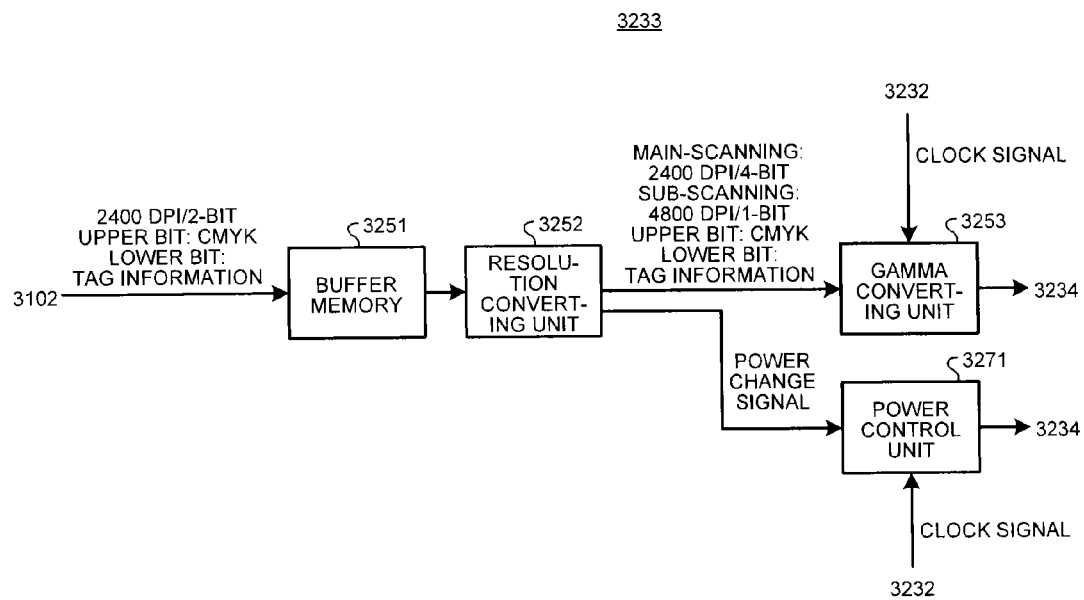
FIG. 31 is a diagram illustrating a configuration of the modulation signal generating unit 3233 according to a modification.

FIG. 31 is a diagram illustrating a configuration of the modulation signal generating unit 3233 according to a modification. In the modulation signal generating unit 3233 according to the modification, the same components and components with the same functions as those illustrated in FIG. 12 are denoted by the same reference signs, and explanation thereof will not be repeated, except for differences.

The modulation signal generating unit 3233 according to the modification further includes a power control unit 3271.

The first converting unit 3263 in the resolution converting unit 3252 according to the modification outputs a power change signal for instructing a change in the power of the light source 2200, in accordance with a pattern of image data with the second resolution to be output. The power change signal indicates whether the power is to be changed or unchanged by a bit corresponding to the second resolution. For example, the power change signal indicates whether the power is to be changed or unchanged by the resolution corresponding to 4800 dpi. For example, the first converting unit 3263 generates a power change signal to set the power of the light source 2200 to a power (second power) greater than a reference value (first power) when a line or a character with a width thinner than a predetermined width is to be formed, and to set the power of the light source 2200 to the reference value (first power) in other cases.

The power control unit 3271 changes the optical power output from the light source 2200 with respect to a pixel for which the power change signal is output. More specifically, the power control unit 3271 emits light with the first power from the light source 2200 for a pixel for which the power change signal is not output, and emits light with the second power higher than the first power from the light source 2200 for a pixel for which the power change signal is output. The power control unit 3271 modulates the received power change signal to a clock signal to generate a power modulation signal. The power control unit 3271 sends the power modulation signal to the light source driving unit 3234.

The light source driving unit 3234 controls an exposure power for each pixel in accordance with the power modulation signal. As for a pixel for which a change of power is not instructed, the light source driving unit 3234 exposes the pixel with the power corresponding to the normal reference value (first power, 100%) to form the pixel. As for a pixel for which a change of power is instructed, the light source driving unit 3234 exposes the pixel with the power (second power, 200%) higher than the normal reference value to form the pixel.

Figure 32:
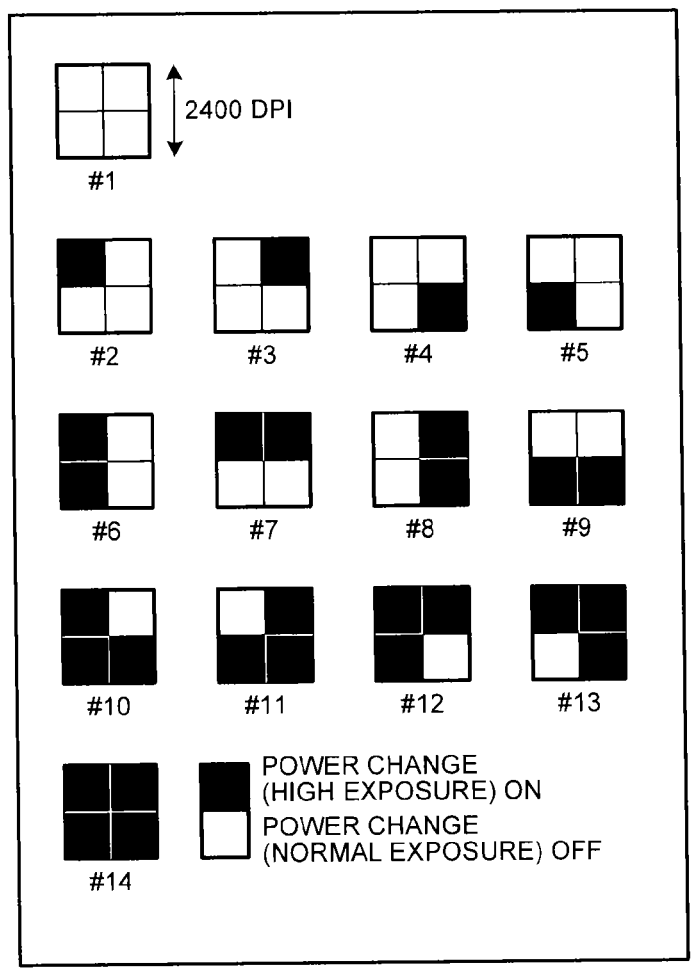
FIG. 32 is a diagram illustrating an example of power change patterns.

FIG. 32 is a diagram illustrating an example of power change patterns. When the acquired image matrix matches any of the layouts illustrated in FIGS. 18 to 20, the first converting unit 3263 outputs a power change signal of any of patterns #1 to #14 with the second resolution illustrated in FIG. 32, at a timing of the target pixel in the center.

The power change pattern #1 is a pattern, in which all of 2×2 pixels are set to OFF (exposure with the normal power).

The power change pattern #2 is a pattern, in which one pixel on the upper left of 2×2 pixels is set to ON (exposure with the power higher than the normal power). The power change pattern #3 is a pattern, in which one pixel on the upper right of 2×2 pixels is set to ON. The power change pattern #4 is a pattern, in which one pixel on the lower right of 2×2 pixels is set to ON. The power change pattern #5 is a pattern, in which one pixel on the lower left of 2×2 pixels is set to ON.

The power change pattern #6 is a pattern, in which two pixels on the upper left and the lower left of 2×2 pixels are set to ON. The power change pattern #7 is a pattern, in which two pixels on the upper left and the upper right of 2×2 pixels are set to ON. The power change pattern #8 is a pattern, in which two pixels of the upper right and the lower right of 2×2 pixels are set to ON. The power change pattern #9 is a pattern, in which two pixels of the lower left and the lower right of 2×2 pixels are set to ON.

The power change pattern #10 is a pattern, in which three pixels on the upper left, the lower left, and the lower right of 2×2 pixels are set to ON. The power change pattern #11 is a pattern, in which three pixels on the lower left, the upper right, and the lower right of 2×2 pixels are set to ON. The power change pattern #12 is a pattern, in which three pixels on the upper left, the lower left, and the upper right of 2×2 pixels are set to ON. The power change pattern #13 is a pattern, in which three pixels on the upper left, the upper right, and the lower right of 2×2 pixels are set to ON.

The power change pattern #14 is a pattern, in which all of 2×2 pixels are set to ON.

Figure 33:
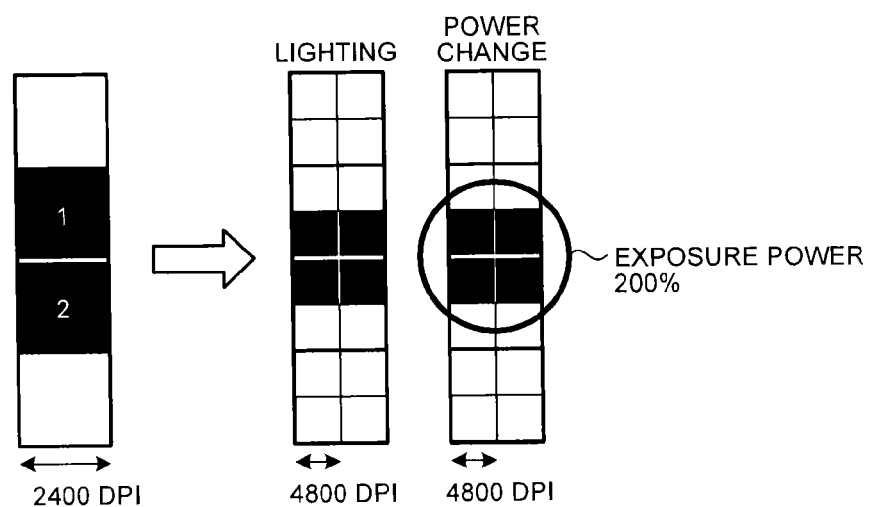
FIG. 33 is a diagram illustrating an example of a process when the power is changed.

FIG. 33 is a diagram illustrating an example of a process when the power is changed. For example, the first converting unit 3263 outputs a power change pattern to increase the power of the light source 2200 from the normal power when a line or a character with a width thinner than a predetermined width is to be formed, and to set the power of the light source 2200 to the normal power in other cases. Accordingly, as illustrated in FIG. 33 for example, even when black pixels are thinned such that the width of the line corresponds to two pixels of 4800 dpi and the amount of exposure with the normal power is not enough, the power control unit 3271 can perform exposure with the adequately high power (for example, 200% of the exposure power) and form a thin line with high quality.

Figure 34:
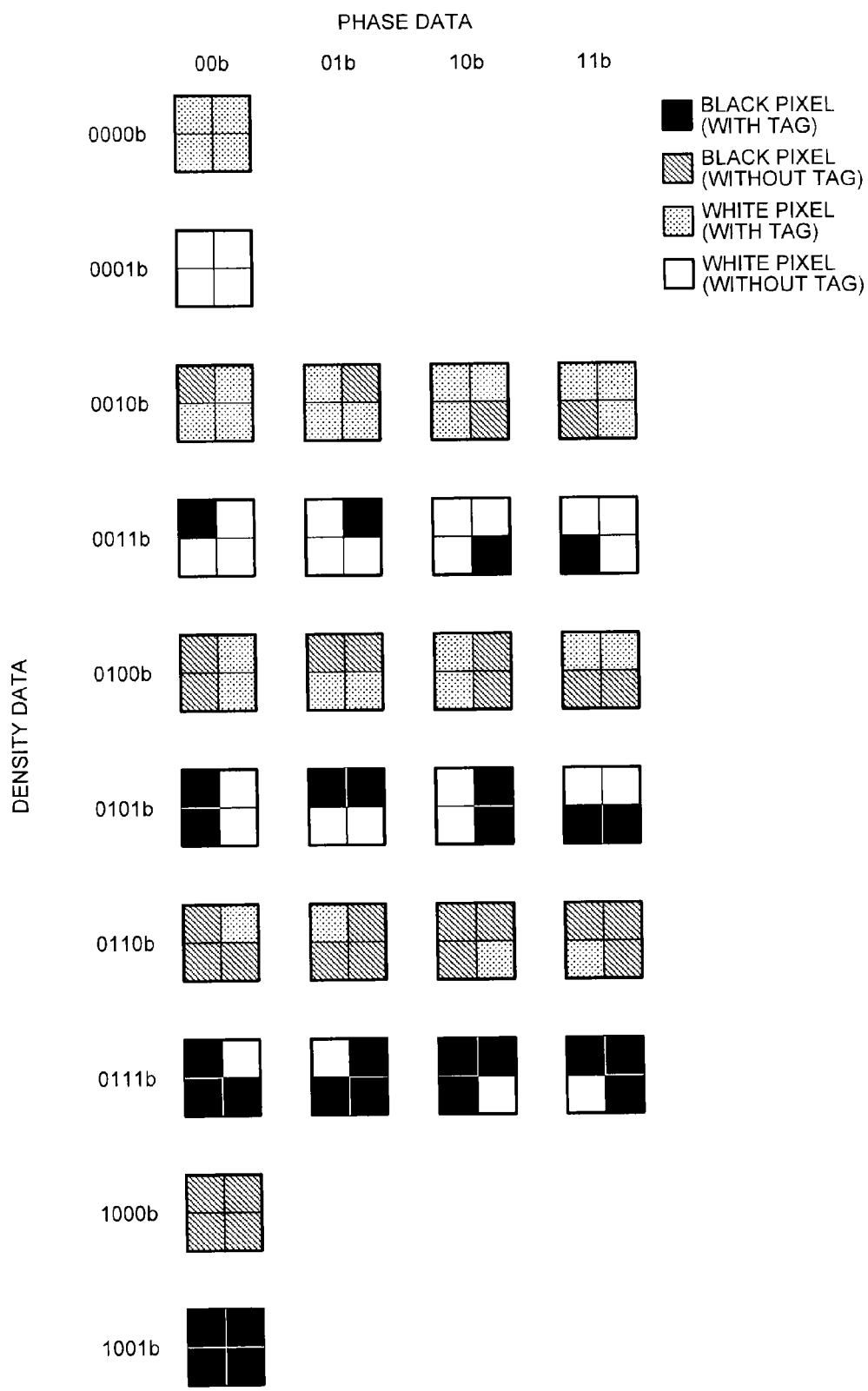
FIG. 34 is a diagram illustrating an example of assignment of tag information.

FIG. 34 is a diagram illustrating an example of assignment of the tag information. The tag generating unit 3226 generates tag information indicating whether or not each of pixels of image data of 1200 dpi is a pixel of a character or a line. The tag information generated by the tag generating unit 3226 is sent to the drive control unit 3103 via the position correcting unit 3224 and the gradation processing unit 3225.

The position correcting unit 3224 may change the assignment of the tag information in accordance with density data and an edge direction of a corresponding pixel (1200 dpi). For example, as illustrated in FIG. 34, the position correcting unit 3224 divides the density of a pixel of the image data (1200 dpi) into ten levels, divides the direction of an edge into four directions, and change a pixel value (a black pixel or a white pixel) and tag information (with tag or without tag) in accordance with the density and the phase. Therefore, the resolution converting unit 3252 can detect an area that matches more detailed conditions from image data with the first resolution.

As described above, according to the color printer 2000 of the embodiment, it is possible to perform image processing with a higher resolution to improve image quality, without increasing the amount of image data to be transferred.

According to the embodiment of the present invention, it is possible to perform image processing with a higher resolution to improve image quality, without increasing the amount of image data to be transferred.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image corresponding to light emitted by a light source, the image forming apparatus comprising:
  an image processing unit that forms image data with a first resolution and tag information indicating whether or not each of pixels of the image data is a pixel of a character or a line based on input image data;
  a resolution converting unit that sequentially selects target pixels from the image data with the first resolution, and converts the image data with the first resolution to image data with a second resolution higher than the first resolution for each of the target pixels; and
  a light source driving unit that drives the light source by a modulation signal corresponding to the image data with the second resolution, wherein
  the resolution converting unit includes
    an image matrix acquiring unit that acquires an image matrix that is image data and tag information with the first resolution in an area containing each of the target pixels and pixels around the target pixel;
    a pattern matching unit that determines whether or not the target pixel is a pixel of an edge of a character or a line based on a layout of the image data and the tag information in the image matrix; and
    a first converting unit that, when the target pixel is the pixel of the edge of the character or the line, converts the image data to image data with the second resolution of a pattern that is determined in accordance with the layout.

2. The image forming apparatus according to claim 1, further comprising a second converting unit that, when the target pixel is not the pixel of the edge of the character or the line, converts the image data to image data with the second resolution of a pattern corresponding to a value of the target pixel.

3. The image forming apparatus according to claim 1, wherein
  the image processing unit assigns tag information indicating a character or a line to a pixel of a character or a line in the image data with the first resolution, and
  the first converting unit converts the target pixel to image data with the second resolution of a pattern subjected to image processing for thinning a character or a line.

4. The image forming apparatus according to claim 1, wherein
  the image processing unit assigns tag information indicating a character or line to a pixel of an outline character or an outline line in the image data with the first resolution, and
  the first converting unit converts the target pixel to image data with the second resolution of a pattern subjected to image processing for thickening the outline character or the outline line.

5. The image forming apparatus according to claim 1, wherein
  the first converting unit outputs a power change signal for instructing a change in a power of the light source in accordance with a pattern of image data with the second resolution to be output, and the image forming apparatus further comprises a power control unit that changes an optical power output from the light source with respect to a pixel for which the power change signal is output.

6. The image forming apparatus according to claim 5, wherein the power control unit causes the light source to emit light with a first power for a pixel for which the power change signal is not output, and causes the light source to emit light with a second power higher than the first power for a pixel for which the power change signal is output.

7. The image forming apparatus according to claim 1, wherein the resolution converting unit and the light source driving unit are integrated into a single integrated device.

8. The image forming apparatus according to claim 1, wherein the light source is a vertical-cavity surface-emitting laser.

9. An image forming apparatus that forms an image corresponding to light emitted by a light source, the image forming apparatus comprising:
   image processing circuitry that forms image data with a first resolution and tag information indicating whether or not each of pixels of the image data is a pixel of a character or a line based on input image data;
   resolution converting circuitry that sequentially selects target pixels from the image data with the first resolution, and converts the image data with the first resolution to image data with a second resolution higher than the first resolution for each of the target pixels; and
   light source driving circuitry that drives the light source by a modulation signal corresponding to the image data with the second resolution, wherein
   the resolution converting circuitry includes
      image matrix acquiring circuitry that acquires an image matrix that is image data and tag information with the first resolution in an area containing each of the target pixels and pixels around the target pixel;
      pattern matching circuitry that determines whether or not the target pixel is a pixel of an edge of a character or a line based on a layout of the image data and the tag information in the image matrix; and
      first converting circuitry that, when the target pixel is the pixel of the edge of the character or the line, converts the image data to image data with the second resolution of a pattern that is determined in accordance with the layout.

10. The image forming apparatus according to claim 9, further comprising a second converting circuitry that, when the target pixel is not the pixel of the edge of the character or the line, converts the image data to image data with the second resolution of a pattern corresponding to a value of the target pixel.

11. The image forming apparatus according to claim 9, wherein
   the image processing circuitry assigns tag information indicating a character or a line to a pixel of a character or a line in the image data with the first resolution, and
   the first converting circuitry converts the target pixel to image data with the second resolution of a pattern subjected to image processing for thinning a character or a line.

12. The image forming apparatus according to claim 9, wherein
   the image processing circuitry assigns tag information indicating a character or line to a pixel of an outline character or an outline line in the image data with the first resolution, and
   the first converting circuitry converts the target pixel to image data with the second resolution of a pattern subjected to image processing for thickening the outline character or the outline line.

13. The image forming apparatus according to claim 9, wherein
   the first converting circuitry outputs a power change signal for instructing a change in a power of the light source in accordance with a pattern of image data with the second resolution to be output, and
   the image forming apparatus further comprises power control circuitry that changes an optical power output from the light source with respect to a pixel for which the power change signal is output.

14. The image forming apparatus according to claim 13, wherein the power control circuitry causes the light source to emit light with a first power for a pixel for which the power change signal is not output, and causes the light source to emit light with a second power higher than the first power for a pixel for which the power change signal is output.

15. The image forming apparatus according to claim 9, wherein the resolution converting circuitry and the light source driving circuitry are integrated into a single integrated device.

16. The image forming apparatus according to claim 9, wherein the light source is a vertical-cavity surface-emitting laser.

* * * * *